United States Patent [19]

Gonzales et al.

[11] Patent Number: 5,231,484
[45] Date of Patent: Jul. 27, 1993

[54] MOTION VIDEO COMPRESSION SYSTEM WITH ADAPTIVE BIT ALLOCATION AND QUANTIZATION

[75] Inventors: Cesar A. Gonzales, Katonah, N.Y.; Eric Viscito, Danbury, Conn.

[73] Assignee: International Business Machines Corporation, Armonk, N.Y.

[21] Appl. No.: 789,505

[22] Filed: Nov. 8, 1991

[51] Int. Cl.⁵ ............................................. H04N 7/133
[52] U.S. Cl. ...................................... 358/133; 358/141
[58] Field of Search ................................ 358/133, 141

[56] References Cited

U.S. PATENT DOCUMENTS 5,111,292  5/1992  Kuriacose ........................... 358/133

*Primary Examiner*—Howard W. Britton
*Attorney, Agent, or Firm*—Thomas P. Dowd

[57] ABSTRACT

A system and method are disclosed for implementing an encoder suitable for use with the proposed ISO/IEC MPEG standards including three cooperating components or subsystems that operate to variously adaptively pre-process the incoming digital motion video sequences, allocate bits to the pictures in a sequence, and adaptively quantize transform coefficients in different regions of a picture in a video sequence so as to provide optimal visual quality given the number of bits allocated to that picture.

30 Claims, 14 Drawing Sheets

I B B P B B P B B I

From Unit 32

MOTION VIDEO COMPRESSION SYSTEM WITH ADAPTIVE BIT ALLOCATION AND QUANTIZATION

BACKGROUND OF THE INVENTION

1. Field of the Invention

The present invention relates to the field of data compression and, more particularly, to a system and techniques for compressing digital motion video signals in keeping with algorithms similar to the emerging MPEG standard proposed by the international Standards Organization's Moving Picture Experts Group (MPEG).

2. Environment

Technological advances in digital transmission networks, digital storage media, Very Large Scale Integration devices, and digital processing of video and audio signals are converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: videotelephony and teleconferencing; high quality digital television transmission on coaxial and fiber-optic networks as well as broadcast terrestrially and over direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120the CCITT Recommendation H.261, and the ISO/IEC MPEG standard. The MPEG algorithm, has been developed by the Moving Picture Experts Group (MPEG), part of a joint technical committee of the International Standards Organization (ISO) and the International Electrotechnical Commission (IEC). The MPEG committee has been developing a standard for the multiplexed, compressed representation of video and associated audio signals. The standard specifies the syntax of the compressed bit stream and the method of decoding, but leaves considerable latitude for novelty and variety in the algorithm employed in the encoder.

As the present invention may be applied in connection with such an encoder, in order to facilitate an understanding of the invention, some pertinent aspects of the MPEG video compression algorithm will be reviewed. It is to be noted, however, that the invention can also be applied to other video coding algorithms which share some of the features of the MPEG algorithm.

The MPEG Video Compression Algorithm

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. (See, e.g., T. Berger, *Rate Distortion Theory*, Englewood Cliffs, N.J.: Prentice-Hall, 1977; R. McELIECE, *The Theory of Information and Coding*, Reading, MASS.: Addison-Wesley, 1971; D.A. HUFFMAN, "A Method for the Construction of Minimum Redundancy Codes," Proc. IRE, pp. 1098–1101, September 1952; G. G. LANGDON," An Introduction to Arithmetic Coding," IBM J. Res. Develop., vol. 28, pp. 135–149, March 1984). Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG algorithm for Step 1 can be described as predictive/interpolative motion-compensated hybrid DCT/DPCM coding. Huffman coding, also known as variable length coding (see the above-cited HUFFMAN 1952 paper) is used in Step 2. Although, as mentioned, the MPEG standard is really a specification of the decoder and the compressed bit stream syntax, the following description of the MPEG specification is, for ease of presentation, primarily from an encoder point of view.

The MPEG video standard specifies a coded representation of video for digital storage media, as set forth in ISO-IEC JTC1SC2/WG11MPEG CD-11172Committee Draft, 1991. The algorithm is designed to operate on noninterlaced component video. Each picture has three components: luminance (Y), red color difference ($C_r$), and blue color difference ($C_b$). The $C_r$ and $C_b$ components each have half as many samples as the Y component in both horizontal and vertical directions. Aside from this stipulation on input data format, no restrictions are placed on the amount or nature of pre-processing that may be performed on source video sequences as preparation for compression. Methods for such pre-processing are one object of this invention.

Layered Structure of an MPEG Sequence

An MPEG data stream consists of a video stream and an audio stream which are packed, together with systems information and possibly other bitstreams, into a systems data stream that can be regarded as layered. Within the video layer of the MPEG data stream, the compressed data is further layered. A description of the organization of the layers will aid in understanding the invention. These layers of the MPEG Video Layered Structure are shown in FIGS. 1–4. Specifically the Figures show:

FIG. 1: Exemplary pair of Groups of Pictures (GOP's).

FIG. 2: Exemplary macroblock (MB) subdivision of a picture.

FIG. 3: Exemplary slice subdivision of a picture.

FIG. 4: Block subdivision of a macroblock.

The layers pertain to the operation of the compression algorithm as well as the composition of a compressed bit stream. The highest layer is the Video Sequence Layer, containing control information and parameters for the entire sequence. At the next layer, a sequence is subdivided into sets of consecutive pictures, each known as a *Group of Pictures* (GOP). A general illustration of this layer is shown in FIG. 1. Decoding may begin at the start of any GOP, essentially independent of the preceding GOP's. There is no limit to the number of pictures which may be in a GOP, nor do there have to be equal numbers of pictures in all GOP's.

The third or Picture layer is a single picture. A general illustration of this layer is shown in FIG. 2. The luminance component of each picture is subdivided into $16 \times 16$ regions; the color difference components are subdivided into $8 \times 8$ regions spatially co-sited with the $16 \times 16$ luminance regions. Taken together, these co-sited liminance region and color difference regions make up the fifth layer, known as a macroblock (MB). Macroblocks in a picture are numbered consecutively in lexicographic order, starting with Macroblock 1.

Between the Picture and MB layers is the fourth or slice layer. Each slice consists of some number of consecutive MB's. Slices need not be uniform in size within a picture or from picture to picture. They may be only a few macroblocks in size or extend across multiple rows of MB's as shown in FIG. 3.

Finally, each MB consists of four $8 \times 8$ luminance blocks and two $8 \times 8$ chrominance blocks as seen in FIG. 4. If the width of each luminance picture (in picture elements or pixels) is denoted as C and the height as R (C is for columns, R is for rows), a picture is $C_{MB} = C/16$ MB's wide and $R_{MB} = R/16$ MB's high. Similarly, it is $C_B = C/8$ blocks wide and $R_B = R/8$ blocks high.

The Sequence, GOP, Picture, and slice layers all have headers associated with them. The headers begin with byte-aligned Start Codes and contain information pertinent to the data contained in the corresponding layer.

Within a GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Each GOP must start with an I-picture and additional I-pictures can appear within the GOP. The other two types of pictures, predictively motion-compensated (P-pictures) and bidirectionally motion-compensated pictures (B-pictures), will be described in the discussion on motion compensation below.

Certain rules apply as to the number and order of I-, P-, and B-pictures in a GOP. Referring to I- and P-pictures collectively as anchor pictures, a GOP must contain at least one anchor picture, and may contain more. In addition, between each adjacent pair of anchor pictures, there may be zero or more B-pictures. An illustration of a typical GOP is shown in FIG. 5.

Macroblock Coding in I-pictures

One very useful image compression technique is transform coding. (See N.S. JAYANT and P. Noll, *Digital Coding of Waveforms, Principles and Applications to Speech and Video*, Englewood Cliffs, N.J.: Prentice-Hall, 1984, and A. G. TESCHER, "Transform Image Coding," in W. K. Pratt, editor, Image Transmission Techniques, pp. 113-155, New York, N.Y.: Academic Press, 1979.) In MPEG and several other compression standards, the discrete cosine transform (DCT) is the transform of choice. (See K. R. RAO and P. YIP, *Discrete Cosine Transform, Algorithms, Advantages, Applications*, San Diego, Calif.: Academic Press, 1990, and N. AHMED, T. NATARAJAN, and K.R. RAQ, "Discrete Cosine Transform," IEEE Transactions on Computers, pp. 90-93, January 1974.) The compression of an I-picture is achieved by the steps of 1) taking the DCT of blocks of pixels, 2) quantizing the DCT coefficients, and 3) Huffman coding the result. In MPEG, the DCT operation converts a block of $n \times n$ pixels into an $n \times n$ set of transform coefficients. Like several of the international compression standards, the MPEG algorithm uses a DCT block size of $8 \times 8$. The DCT transformation by itself is a lossless operation, which can be inverted to within the precision of the computing device and the algorithm with which it is performed.

The second step, quantization of the DCT coefficients, is the primary source of lossiness in the MPEG algorithm. Denoting the elements of the two-dimensional array of DCT coefficients by csubmn, where m and n can range from 0 to 7, aside from truncation or rounding corrections, quantization is achieved by dividing each DCT coefficient $c_{mn}$ by $w_{mn} \times QP$, with $w_{mn}$ being a weighting factor and QP being the quantizer parameter. Note that QP is applied to each DCT coefficient. The weighting factor $w_{mn}$ allows coarser quantization to be applied to the less visually significant coefficients. There can be two sets of these weights, one for I-pictures and the other for P- and B-pictures. Custom weights may be transmitted in the video sequence layer, or defaults values may be used. The quantizer parameter QP is the primary means of trading off quality vs. bit-rate in MPEG. It is important to note that QP can vary from MB to MB within a picture. This feature, known as adaptive quantization (AQ), permits different regions of each picture to be quantized with different step-sizes, and can be used to attempt to equalize (and optimize) the visual quality over each picture and from picture to picture. Although the MPEG standard allows adaptive quantization, algorithms which consist of rules for the use of AQ to improve visual quality are not subject to standardization. A class of rules for AQ is one object of this invention.

Following quantization, the DCT coefficient information for each MB is organized and coded, using a set of Huffman codes. As the details of this step are not essential to an understanding of the invention and are generally understood in the art, no further description will be offered here. For further information in this regard reference may be had to the previously-cited HUFFMAN 1952 paper.

Motion Compensation

Most video sequences exhibit a high degree of correlation between consecutive pictures. A useful method to remove this redundancy prior to coding a picture is "motion compensation". Motion compensation requires some means for modeling and estimating the motion in a scene. In MPEG, each picture is partitioned into macroblocks and each MB is compared to $16 \times 16$ regions in the same general spatial location in a predicting picture or pictures. The region in the predicting picture(s) that best matches the MB in some sense is used as the prediction. The difference between the spatial location of the MB and that of its predictor is referred to as a motion vector. Thus, the outputs of the motion estimation and compensation for an MB are motion vectors and a motion-compensated difference macroblock. In compressed form, these generally require fewer bits than the original MB itself. Pictures which are predictively motion-compensated using a single predicting picture in the past are known as P-pictures. This kind of prediction is also referred to in MPEG as forward-in-time prediction.

As discussed previously, the time interval between a P-picture and its predicting picture can be greater than one picture interval. For pictures that fall between P-pictures or between an I-picture and a P-picture, backward-in-time prediction may be used in addition to forward-in-time prediction (see FIG. 5). Such pictures are known as bidirectionally motion-compensated pictures, B-pictures. For B-pictures, in addition to forward and backward prediction, interpolative motion compensation is allowed in which the predictor is an average of a block from the previous predicting picture and a block from the future predicting picture. In this case, two motion vectors are needed. The use of bidirectional motion compensation leads to a two-level motion compensation structure, as depicted in FIG. 5. Each arrow indicates the prediction of the picture touching the arrowhead using the picture touching the dot. Each P-picture is motion-compensated using the previous anchor picture (I-picture or P-picture, as the case may be). Each B-picture is motion-compensated by the anchor pictures immediately before and after it. No limit is specified in MPEG on the distance between anchor pictures, nor on the distance between I-pictures. In fact, these parameters do not have to be constant over an entire sequence. Referring to the distance between I-pictures as N and to the distance between P-pictures as M, the sequence shown in FIG. 5 has $(N,M)=(9,3)$. In coding the three picture types, different amounts of compressed data are required to attain similar levels of reconstructed picture quality. The exact ratios depend on many things, including the amount of spatial detail in the sequence, and the amount and compensability of motion in the sequence.

It should therefore be understood that an MPEG-1 sequence consists of a series of I-pictures which may have none or one or more P-pictures sandwiched between them. The various I- and P-pictures may have no B-pictures or one or more B-pictures sandwiched between them, in which latter event they operate as anchor pictures.

Macroblock Coding in P-pictures and B-pictures

It will be appreciated that there are three kinds of motion compensation which may be applied to MB's in B-pictures: forward, backward, and interpolative. The encoder must select one of these modes. For some MBs, none of the motion compensation modes yields an accurate prediction. In such cases, the MB may be processed in the same fashion as a macroblock in an I-picture, i.e., as an intramode MB). This is another possible MB mode. Thus, there are a variety of MB modes for P- and B-pictures.

Aside from the need to code side information relating to the MB mode used to code each MB and any motion vectors associated with that mode, the coding of motion-compensated macroblocks is very similar to that of intramode MBs. Although there is a small difference in the quantization, the model of division by $w_{mn} \times QP$ still holds. Furthermore, adaptive quantization (AQ) may be used.

Rate Control

The MPEG algorithm is intended to be used primarily with fixed bit-rate storage media. However, the number of bits in each picture will not be exactly constant, due to the different types of picture processing, as well as the inherent variation with time of the spatio-temporal complexity of the scene being coded. The MPEG algorithm uses a buffer-based rate control strategy to put meaningful bounds on the variation allowed in the bit-rate. A *Video Buffer Verifier* (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer. In order that the bit stream satisfy the MPEG rate control requirements, it is necessary that all the data for each picture is available within the buffer at the instant it is needed by the decoder. This requirement translates to upper and lower bounds ($U^{VBV}$ and $L^{VBV}$) on the number of bits allowed in each picture. The upper and lower bounds for a given picture depend on the number of bits used in all the pictures preceding it. It is the function of the encoder to produce bit streams which satisfy this requirement. It is not expected that actual decoders will be configured or operate in the manner described above. The hypothetical decoder and it's associated buffer are simply a means of placing computable limits on the size of compressed pictures.

One important function of an MPEG encoder is to ensure that the video bitstream it produces satisfies these bounds. There are no other restrictions on the number of bits used to code the pictures in a sequence. This latitude should be used to allocate the bits in such a way as to equalize (and optimize) the visual quality of the resulting reconstructed pictures. A solution to this bit allocation problem is another object of this invention.

THE PROBLEM

It should be understood, therefore, from the foregoing description of the MPEG algorithm, that the purpose of the MPEG standard is to specify the syntax of the compressed bit stream and the methods used to decode it. Considerable latitude is afforded encoder algorithm and hardware designers to tailor their systems to the specific needs of their application. The degree of complexity in the encoder can be traded off against the visual quality at a particular bit-rate to suit specific applications. A large variety of compressed bit-rates and image sizes are also possible. This will accommodate applications ranging from low bit-rate videophones up to full-screen multimedia presentations with quality comparable to VHS videocassette recordings. Consequently, the problem to which the present invention is addressed is achieving compression of digital video sequences in accordance with the MPEG standard, applying techniques of the type discussed above using adaptive quantization and bit-rate control in a manner that optimizes the visual quality of the compressed sequence while ensuring that the bit stream satisfies the MPEG fixed bit-rate requirements.

PRIOR ART

In the open literature, a number of schemes have appeared which address certain aspects of the problem of adaptive quantization and bit-rate control. For example, W-H CHEN and W. K. PRATT, in their paper, "Scene Adaptive Coder," IEEE Trans. Communications, vol. COM-32, pp. 225-232, March 1984, discuss the idea of a rate-controlled quantization factor for transform coefficients. The rate control strategy used there is commonly applied in image and video compression algorithms to match the variable bit-rate produced when coding to a constant bit-rate channel. More details on such techniques can be found in the above-cited TESCHER 1979 book chapter.

Although the CHEN and PRATT 1984 paper deals with image coding, the ideas set forth therein would be applicable to video coding as well. However, there is no mechanism for adapting the quantization factor according to the nature of the images themselves.

C-T. CHEN and D. J. LeGALL describe an adaptive scheme for selecting the quantization factor based on the magnitude of the k-th largest DCT coefficient in each block in their article "A K-th Order Adaptive Transform Coding Algorithm for Image Data Compression," SPIE Vol. 1153, Applications of Digital Image Processing XII, vol. 1153, pp. 7-18, 1989.

H. LOHSCHELLER proposes a technique for classifying blocks in "A Subjectively Adapted Image Communication System," IEEE Trans. Communications, vol. COM-32, pp. 1316-1322, December 1984. This technique is related to adaptive zonal sampling and adaptive vector quantization.

K. N. NGAN, K. S. LEONG, AND H. SINGH, in "A HVS-weighted Cosine Transform Coding Scheme with Adaptive Quantization," SPIE Vol. 1001 Visual Communications and Image Processing, vol. 1001, pp. 702-708, 1988, propose an adaptive quantizing transform image coding scheme in which a rate controlling buffer and the contrast of the DC term of each block with respect to its nearest neighbor blocks in raster scan order are used in combination to adapt the quantizer factor. H. HOELZLWIMMER, discusses in "Rate Control in Variable Transmission Rate Image Coders," SPIE Vol. 1153 Applications of Digital Image Processing XII, vol. 1153, pp. 77-89, 1989, a combined bit-rate and quality controller. Two parameters are used to control the reconstruction error and bit-rate, quantizer step size and spatial resolution. A spatial domain weighted means square error measure is used to control the parameters.

Co-pending application U.S. Ser. No. 705,234, filed May 24, 1991 by the present inventors addresses the problem of adaptive quantization. The techniques disclosed therein can be used as one of the subsystems in the present invention, that is, the Adaptive-quantizing Rate-controlled (AQ/RC) Picture Coder.

OBJECTS

In contrast to the foregoing prior art systems and algorithms, it is an object of the present invention to provide a system and techniques for allocating bits among compressed pictures in a video sequence, which applies specifically to video compression algorithms intended to produce a fixed-bit-rate compressed data stream, and in which motion compensation is employed, such as the ISO/IEC MPEG video compression standard.

It is a further object of the present invention to provide a system and techniques for adaptive quantization of transform coefficients in different regions of a picture in a video sequence so as to optimally allocate a fixed number of bits to that picture, and to provide bit-rate error feedback techniques to ensure that the actual number of bits used is close to the number allocated to the picture. In principle, this system can be used in a variable-bit-rate coder, as well as compatibly in a fixed-bit-rate coder.

Another object of the present invention is to provide a system and techniques for adaptive pre-processing of digital motion video sequences prior to coding, with the nature of the pre-processing dependent on the severity of quantization necessary to meet the target bit-rate in the recent pictures of the sequence.

A further object of the invention is to provide a technique for the harmonious joint operation of the foregoing three systems to form an improved encoder system compatible with the MPEG standard.

SUMMARY OF THE INVENTION

The present invention involves a system and methods for implementing an encoder suitable for use with the proposed ISO/IEC MPEG standards including three cooperating components or subsystems that operate to variously adaptively pre-process the incoming digital motion video sequences, allocate bits to the pictures in a sequence, and adaptively quantize transform coefficients in different regions of a picture in a video sequence so as to provide optimal visual quality given the number of bits allocated to that picture.

More particularly, one component embodies an adaptive pre-processing subsystem which applies one of a set of pre-processing operations to the video sequence according to the overall coarseness of the quantization required. The pre-processing operations are applied prior to coding, with the nature of pre-processing dependent on the severity of quantization necessary to meet the target bit-rate in the recent pictures.

Another component embodies a subsystem for performing a picture bit allocation method. The method is applicable to video compressiom algorithms intended to produce a fixed-bit-rate compressed data stream, and in which motion compensation is employed. One example of such an algorithm is the MPEG video compression standard. This method of allocating bits among the successive pictures in a video sequence equalizes visual quality from picture to picture, while meeting the MPEG Video Buffer Verifier (VBV) bit-rate limitations.

A third component embodies a subsystem for implementing algorithms for adaptive quantization of transform coefficients in different regions of a picture in a video sequence, and bit-rate error feedback techniques to ensure that the actual number of bits used is close to the number allocated to the picture.

The three cooperating components or subsystems operate compatibly with each other and each may be individually modified to accomplish the same task, without necessarily requiring the modification of either of the other subsystems. The adaptive quantizing subsystem may be used by itself and each of the subsystems may also be used with other encoder implementations.

BRIEF DESCRIPTION OF THE DRAWINGS

FIG. 1 depicts an exemplary set of Groups of Pictures (GOP's), FIG. 2 depicts an exemplary Macroblock (MB) subdivision of a picture, FIG. 3 depicts an exemplary Slice subdivision of a frame or picture, and FIG. 4 depicts the Block subdivision of a Macroblock.

DETAILED DESCRIPTION OF THE PREFERRED EMBODIMENTS

Preliminarily, as noted above, an important feature of the ISO/IEC MPEG standard is that only the syntax of the compressed bit stream and the method of decoding it are specified in detail. Therefore, it is possible to have different encoders, all of which produce bit streams compatible with the syntax of the standard, but which are of different complexities, and result in different levels of visual quality at a given bit-rate. The MPEG standard applies primarily, but not exclusively, to situations in which the average bit-rate of the compressed data stream is fixed. The MPEG specification contains a precise definition of the term "fixed bit-rate". However, even though the average rate must be constant, the number of bits allocated to each picture in an MPEG video sequence does not have to be the same for all pictures. Furthermore, allocation of bits within a picture does not have to be uniform. Part of the challenge in designing an encoder that produces high quality sequences at low bit-rates is developing a technique to allocate the total bit budget among pictures and within a picture.

Also to be kept in mind is another coding feature of importance to the MPEG standard, that is, adaptive quantization (AQ). This technique permits different regions of each picture to be coded with varying degrees if fidelity, and can be used in image and motion video compression to attempt to equalize (and optimize) the visual quality over each picture and from picture to picture. Althou the MPEG standard allows adaptive quantization, algorithms which consist of rules for the use of AQ to improve visual quality are not prescribed in the standard.

Another broad class of techniques that can be applied in an MPEG or similar encoder is generally referred to as pre-processing. Any sort of pre-processing of a digital video sequence which does not change the fundamental spatial relationship of the samples to one another may be incorporated into an MPEG-compatible encoder for the purpose of improving the visual quality of the compressed sequence. Examples of this include linear or nonlinear pre-filtering.

Figure 1:
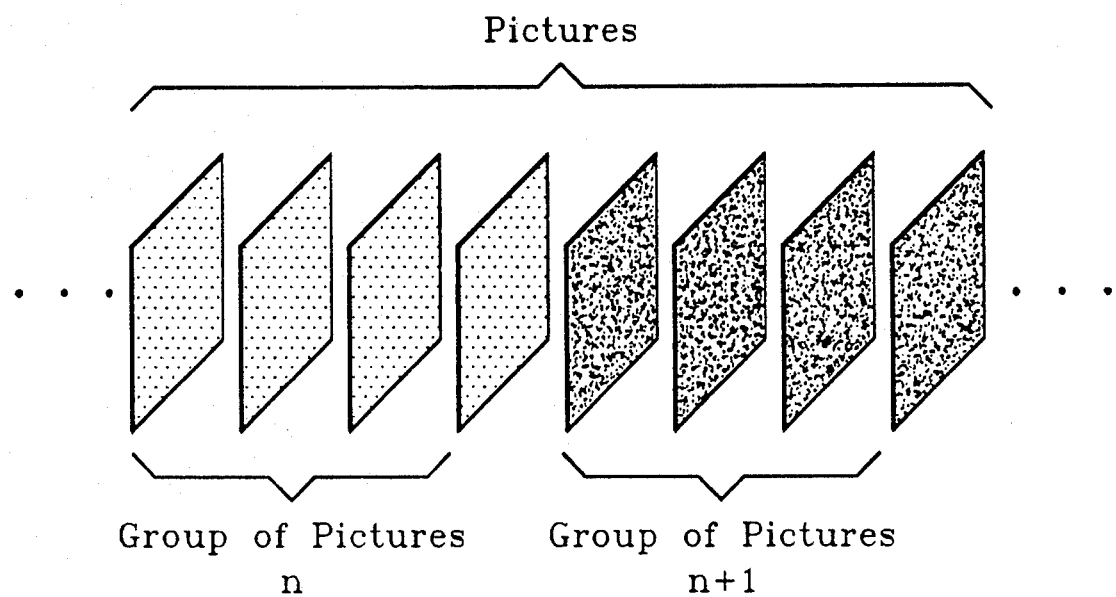
FIGS. 1-4 illustrate layers of compressed data within the video compression layer of the MPEG data stream, i.e.
Figure 2:
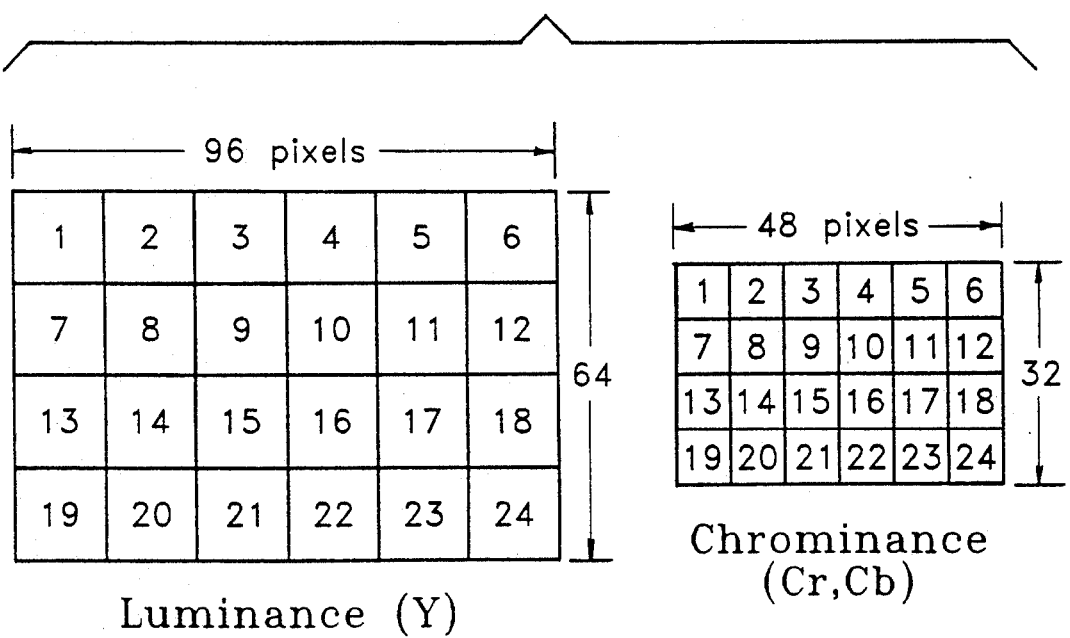
Figure 3:
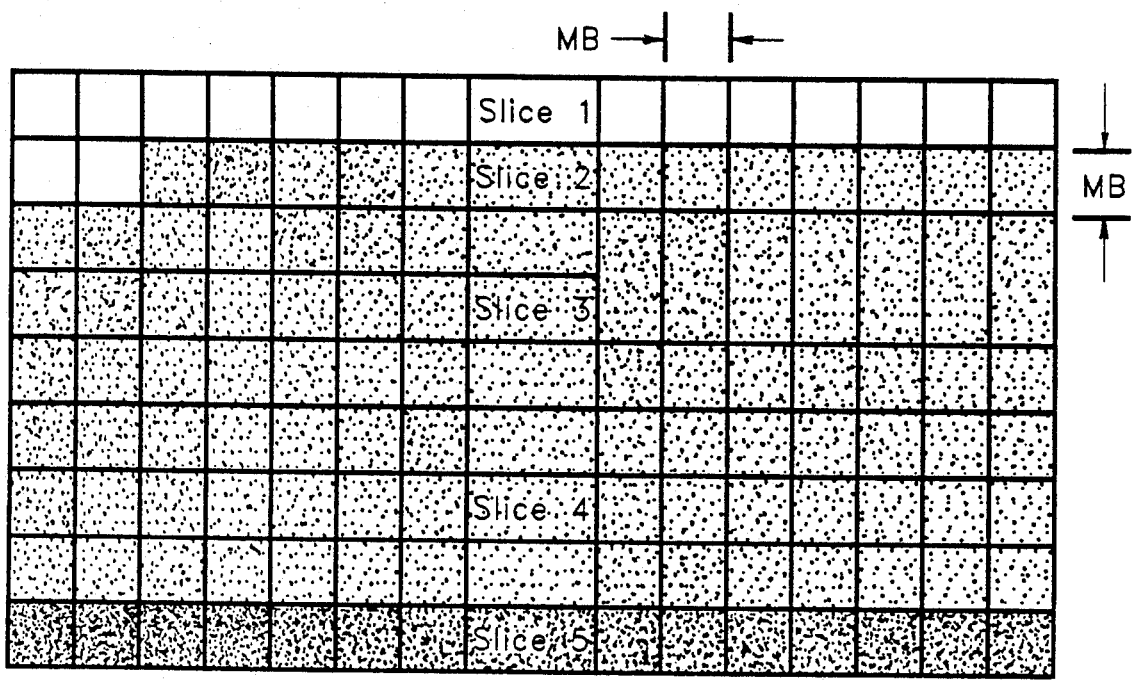
Figure 4:
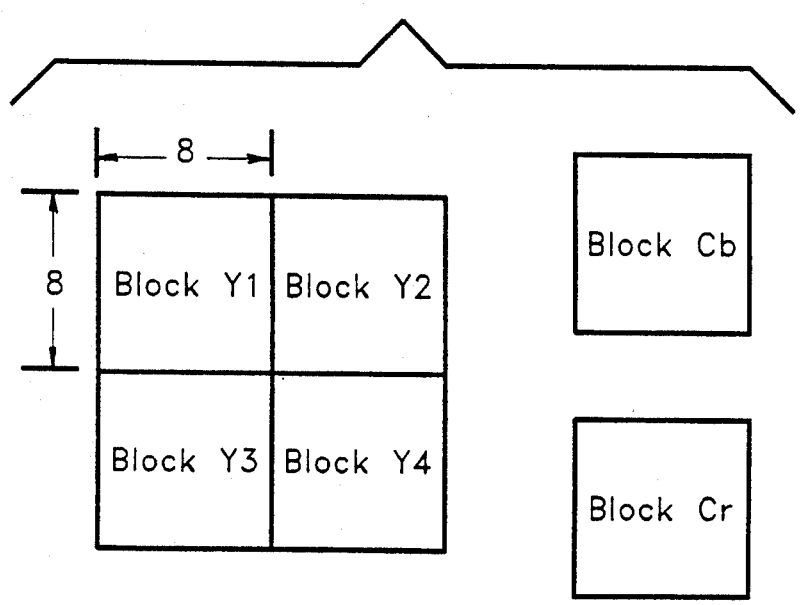
Figure 5:
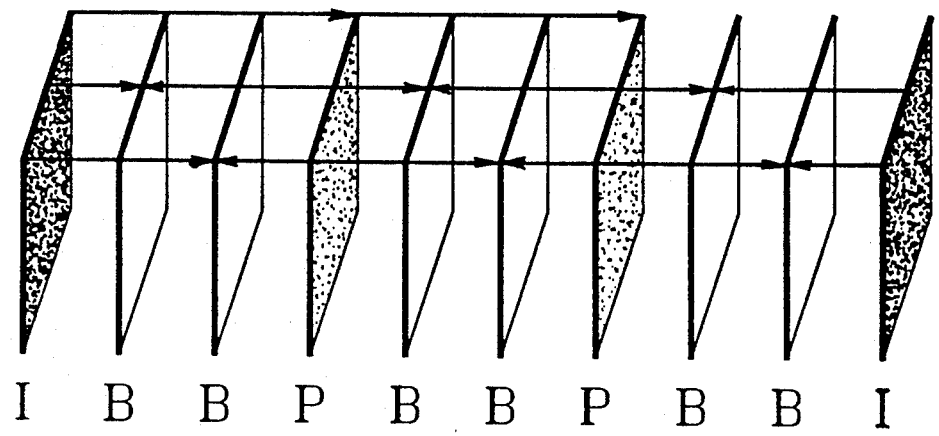
FIG. 5 illustrates the two-level motion compensation among pictures in a GOP employed in MPEG.
Figure 6:
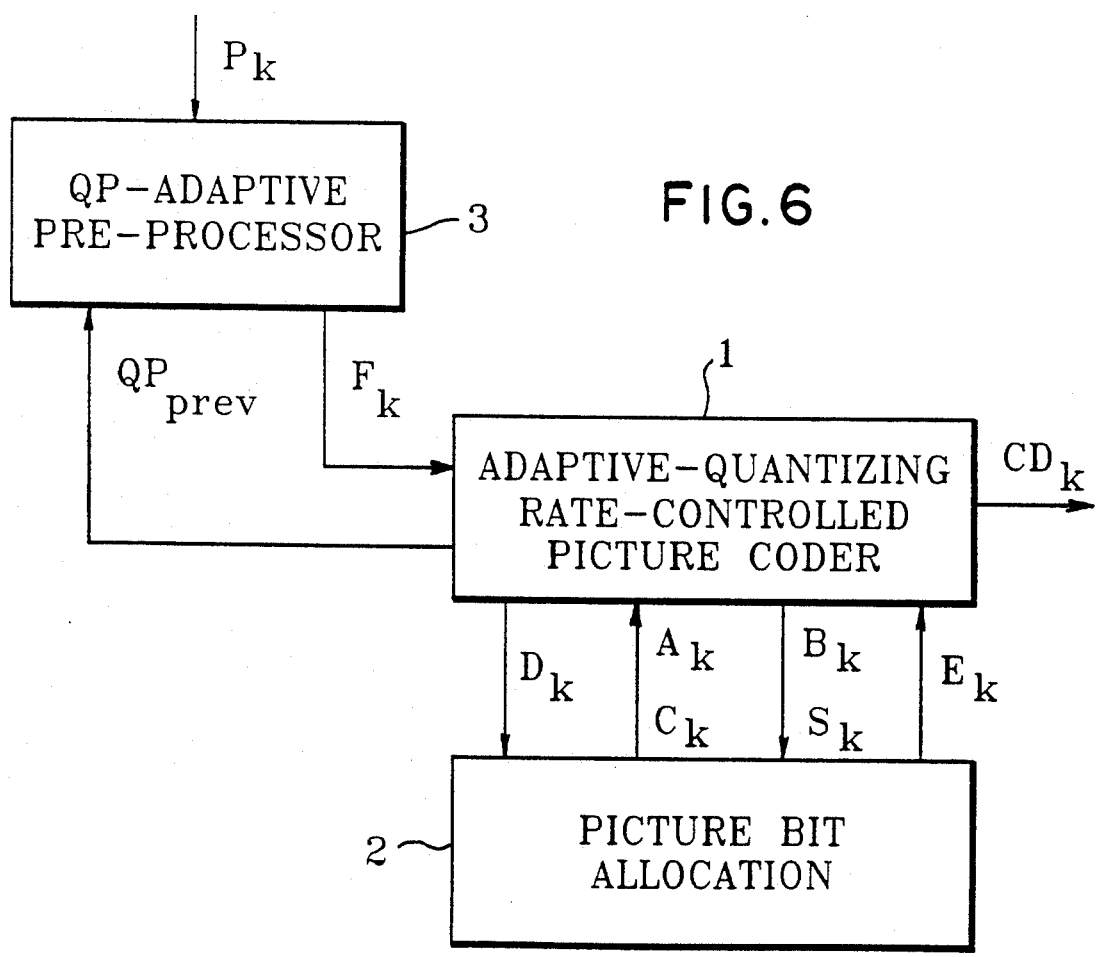
FIG. 6 is a block diagram of an MPEG encoder incorporating three component subsystems for implementing techniques in accordance with the present invention.

Turning to the invention, a block diagram of an MPEG encoder incorporating three component subsystems for implementing the above-mentioned techniques in accordance with the present invention is shown in FIG. 6. As seen in Figure, to begin with, picture data $P_k$ representative of the k-th picture in a sequence enters one subsystem, QP-adaptive Pre-processor 3, where pre-processing may take place if appropriate. The nature of the pre-processing is controlled by quantization levels ($QP_{prev}$) of previously coded pictures, which will have been previously communicated to subsystem 3 from Adaptive-quantizing Rate-controlled (AQ/RC) Picture Coder 1, in the coarse of coding the data sequence. The possibly pre-processed picture data $F_k$ output by subsystem 3 enters the next subsystem, AQ/RC Picture Coder 1, where motion estimation and MB classification take place. Some of the results of these operations within the AQ/RC Picture Coder 1 ($D_k$) are passed to the remaining subsystem, Picture Bit Allocation subsystem 2, and a target number of bits for the picture data $F_k$ is passed back ($A_k$, $S_k$, and $C_k$) to the AQ/RC Picture Coder 1. Coding then proceeds, as is described in more detail below. Ultimately, compressed data for picture data $F_k$, $CD_k$, is output from the AQ/RC Picture Coder 1. Additionally, data relating to the number of bits required to code $F_k$ ($B_k$) and the reconstruction error ($E_r$) are passed to the Picture Bit Allocation subsystem 2, and the previous quantization level $QP_{prev}$, which may be an average value, $QP_{avg}$, is passed to the QP-adaptive Pre-processor subsystem 3, for use in processing future frames.

For purposes of operational descriptions of the three subsystems, the operation of the Picture-to-Picture Bit Allocation subsystem 2 will first be explained, followed by an explanation of the functioning of the AQ/RC Picture Coder subsystem 1, and then the QP-adaptive Pre-processor subsystem 3 will be described. It may be helpful for a full understanding of the relationship of the invention to the MPEG video compression algorithm to refer to the afore-cited MPEG CD-11172 and to ISO-IEC JTC1/SC2/WG11 MPEG 91/74, MPEG Video Report Draft, 1991, or D. LeGALL, "MPEG: A Video Compression Standard for Multimedia Applications," Communications of the ACM, vol. 34, April 1991.

Picture to Picture Bit Allocation

Video compression algorithms employ motion compensation to reduce the amount of data needed to represent each picture in a video sequence. Although fixed-bit-rate compression algorithms must maintain an overall average bit-rate near a specified target, they often have some latitude in the number of bits assigned to an individual picture. Assigning exactly the same number of bits to each picture produces a compressed sequence whose quality fluctuates with time, a phenomenon which is visually distracting to the viewer. The Picture Bit Allocation subsystem 2 involves procedures for allocating bits among compressed pictures in a video sequence. It is applicable specifically to video compression algorithms intended to produce a fixed-bit-rate compressed data stream, and in which motion compensation is employed, e.g., the ISO/IEC MPEG video compression standard.

Ideally, a Picture Bit Allocation system would allocate a number of bits to each picture in such a way that the perceived visual quality of the coded sequence was uniform from picture to picture and equal to the optimum attainable at the given bit-rate, subject to bit allocation limitations imposed by the fixed-bit-rate rules. In general, such a system would require knowledge of the contents of the entire sequence prior to coding the first picture or frame. It would also require a priori knowledge of the visual quality that reconstructed pictures would have when coded using a given bit allocation. The first requirement is impractical because of the potentially large storage and delay implied. The second is currently very difficult because a mathematically tractable model of the perceived visual quality of coded visual data is not known, even when the coded and original pictures are available.

The Picture Bit Allocation subsystem of the present invention provides a practical solution to this problem by keeping track of a measure of the difficulty in coding pictures of each type in the recent past. This measure, referred to as the coding difficulty, depends on the spatial complexity of a picture and the degree to which motion compensation is able to predict the contents of a picture. Bits are allocated to the three picture types in amounts dependent on the relative coding difficulties of the three types. Additionally, the three allocations computed at each picture (one for each picture type) are such that, if an entire Group of Pictures (GOP) were coded using those allocations, the number of bits required would equal the target bit-rate.

Referring to FIG. 6, the Picture Bit Allocation subsystem 2 determines how many bits to allocate to picture k after the data $F_k$ for that picture has been analyzed in the AQ/RC Picture Coder 1, and the coding difficulty factor of the picture has been passed from the AQ/RC Picture Coder 1 to the Picture Bit Allocation subsystem 2, but prior to coding the picture. The Picture Bit Allocation subsystem 2 also uses information pertaining to previously coded pictures, which the AQ/RC Picture Coder 1 is assumed to have already passed to the Picture Bit Allocation subsystem 2. Specifically, this information consists of $B_k$, the number of bits used to code the most recent picture of each type (broken into transform coefficient bits and side bits), and $E_r$, the reconstruction error of the most recent two anchor pictures. When estimating the number of bits to allocate to a particular picture, it is first necessary to select and consider a fixed number of consecutive pictures in the immediate future, i.e., a set of pictures in the sequence yet to be coded which comprises a fixed number of I-pictures ($n_I$), P-pictures ($n_P$), and B-pictures ($n_B$). It is useful that the number and composition of pictures in the set selected for consideration in this step be the same as those used for the picture bit allocation procedure that is performed from picture to picture in the sequence, but not necessary. What is necessary is that the average of the resulting picture bit allocations over time be equal to the target average picture bit allocation.

The allocation operation about to be described begins by considering an allocation for the selected set of pictures, although the final result will be three picture bit allocations, one for each picture type, and only the picture bit allocation for the picture type corresponding to the type of the picture about to be coded will be used. Thus the process begins by computing a total bit allocation $B_{set}$ for the set of pictures which equals the average bit allocation consistent with the target bit rate:

$$B_{set} = (n_I + n_P + n_B) \times B_{avg},$$

where $B_{avg}$ is the average picture bit allocation consistent with the target bit rate. In the preferred embodiment, used as an example throughout this section of the description, the bits allocated to the set of pictures, and those allocated to each picture, fall into two classes: side bits (S) and coefficient bits (C). Here, S is taken to include all coded data other than coded transform coefficient data. By subtracting from the total bit allocation $B_{set}$ an estimate of the number of bits required to code side information in the set of pictures ($S_{set}$), a transform coefficient bit allocation for the set of pictures, $C_{set}$ is obtained. The number of bits allocated to coding the transform coefficients of the picture about to be coded will then be a fraction of $C_{set}$, the size of which fraction will depend on the estimate of the coding difficulty associated with that picture. An exemplary technique for computing the allocation using the coding difficulty information will now be particularly described.

Transform Coefficient and Side Information Allocation

Side bits are assigned to include picture header information and all side information; for example, the motion compensation mode information, motion vectors, and adaptive quantization data. Coefficient information is contained only in the bits used to code the transform coefficients of the pixel data itself (in the case of I-pictures), or the pixel difference data (in the P- and B-picture cases). Letting $A_I$, $A_P$, and $A_B$ be the bit allocation for I-, P-, and B-pictures, respectively, $A_I = S_I + C_I$, $A_P = S_P + C_P$, and $A_B = S_B + C_B$ (where S and C indicate side and coefficient bits, respectively). In the preferred embodiment, the side information bit allocation for the next picture to be coded is set equal to the actual number of bits required to code the side information in the most recent picture of the same type in the sequence. An alternative method of computing the side bit information allocation is to use an average of the actual numbers of bits required to code several or all past pictures of the same type in the sequence. It is also possible to ignore the side information allocations in this procedure, and to compute the picture bit allocation based solely on the transform coefficient bit allocation.

This latter approach can be done, in the context of the following discussion, by assuming all side allocation variables $S_x$ are equal to 0.

An exemplary means for computing the coding difficulty factor associated with a picture will be described below, but, in the meantime, for purposes of the description, it will be understood that once computed the coding difficulty factor for the most recent picture of each type is stored in the Picture Bit Allocation subsystem 2, and the following procedure is used to compute the transform coefficient allocation for the current picture. First, the side information allocation for the set of pictures is estimated by $(S_{set} = n_I S_I + n_P S_P + n_B S_B)$. This quantity is subtracted from the total number of bits allocated to the set, $B_{set}$, yielding the set of pictures transform coefficient allocation:

$$C_{set} = B_{set} - S_{set}$$

Then, $C_I$, $C_P$, and $C_B$ are found as the unique solution to the equations:

$$C_{set} = n_I C_I + n_P C_P + n_B C_B.$$

$$C_P = w_P \frac{D_P - E_r}{D_I} C_I.$$

$$C_B = w_B \frac{D_B - E'_r}{D_I} C_I.$$

The initial equation (for $C_{set}$) in this set ensures that the overall set average is correct. $E'_r$ is the average of the mean absolute errors of the past and future reconstructed anchor pictures, and the weighting terms $w_P$ and $w_B$ serve to de-emphasize the P- and B-picture allocation with respect to the others. Values of: w sub P=1.0 and $w_B=0.5$ are used in the preferred embodiment. Aside from these weights, the latter two equations (for $C_P$ and $C_B$) of the set allocate bits to P- and B-pictures proportional to the degree that their difficulty exceeds the mean absolute error in the (reconstructed) predicting picture(s).

Other bit allocation rules which are based on the coding difficulties of the different picture types are possible. The foregoing exemplary method is valuable, because it accounts for the spatial complexity of the sequence through the three coding difficulty factors, $D_I$, $D_P$, and $D_B$, for the success of the motion compensation through $D_P$ and $D_B$, the target bit-rate through the requirement of the initial equation for $C_{set}$ and the quality of recently coded pictures through $E_r$ and $E'_r$.

Occasionally, the above bit allocation strategy results in an allocation that exceeds $U^{VBV}$ or falls below $L^{VBV}$. The frequency with which this happens depends on the size of the VBV buffer and on the nature of the sequence. A typical scenario is when the VBV buffer is relatively small (e.g., six average pictures or less), and the motion compensation is very successful. In such a situation, the allocation strategy attempts to give virtually all of the transform bits for a set to the I-pictures, resulting in an allocation for an individual picture larger than the VBV buffer size. In the preferred embodiment, when this happens, the I-picture allocation is clipped to fall a small amount inside the corresponding VBV limit, and the bits taken from the I-picture are re-allocated to the P-picture. This latter step is important, because if no explicit re-allocation is done, the average bit rate will drop. This will eventually result in VBV overflow problems, usually as $L^{VBV}$ begins to exceed the B-picture allocations. The net result of that is an implicit reallocation to B-pictures, which generally results in poorer overall picture quality. An additional benefit of the explicit P-picture re-allocation technique is more rapid convergence to extremely high picture quality in still scenes. In the case when a P-picture or B-picture allocation falls outside of the VBV bounds, no re-allocation of bits is done.

Note that the allocation strategy can be applied to cases where there are no B-pictures simply by setting $n_B=0$, and ignoring the equation which sets $C_B$ when computing allocations. It can similarly be applied to cases where no P-pictures exist. In addition, the distinction between coefficient and side information can be ignored, by using the coding difficulty estimate to allocate all the bits for a picture. In such a case, the coding difficulty estimate could factor in the difficulty of coding side information directly, or ignore side information completely.

Figure 7:
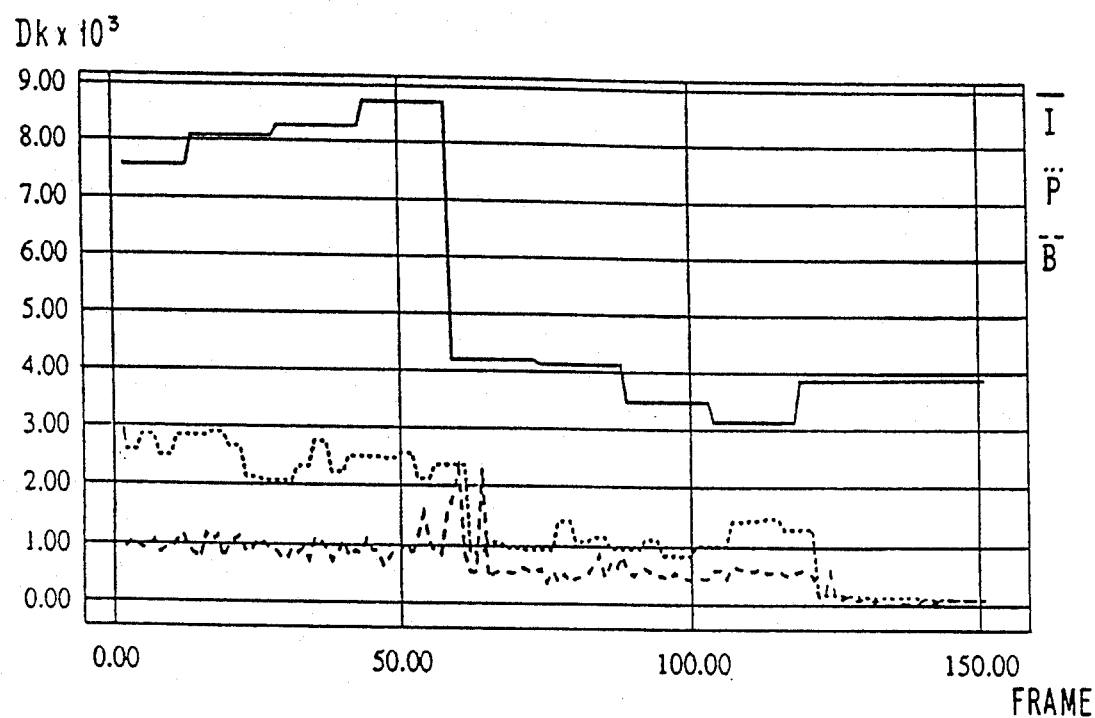
FIG. 7 shows the coding difficulty factors for the entire sequence of pictures in a video sequence, composed of two test sequences used in the MPEG standards effort, including the first 60 frames of the Flower Garden sequence, followed by the first 60 frames of the Table Tennis sequence, followed by 30 repetitions of the 61-st frame of Tennis Table (to simulate a still scene), and used throughout the description to illustrate the methods of the invention.
Figure 8:
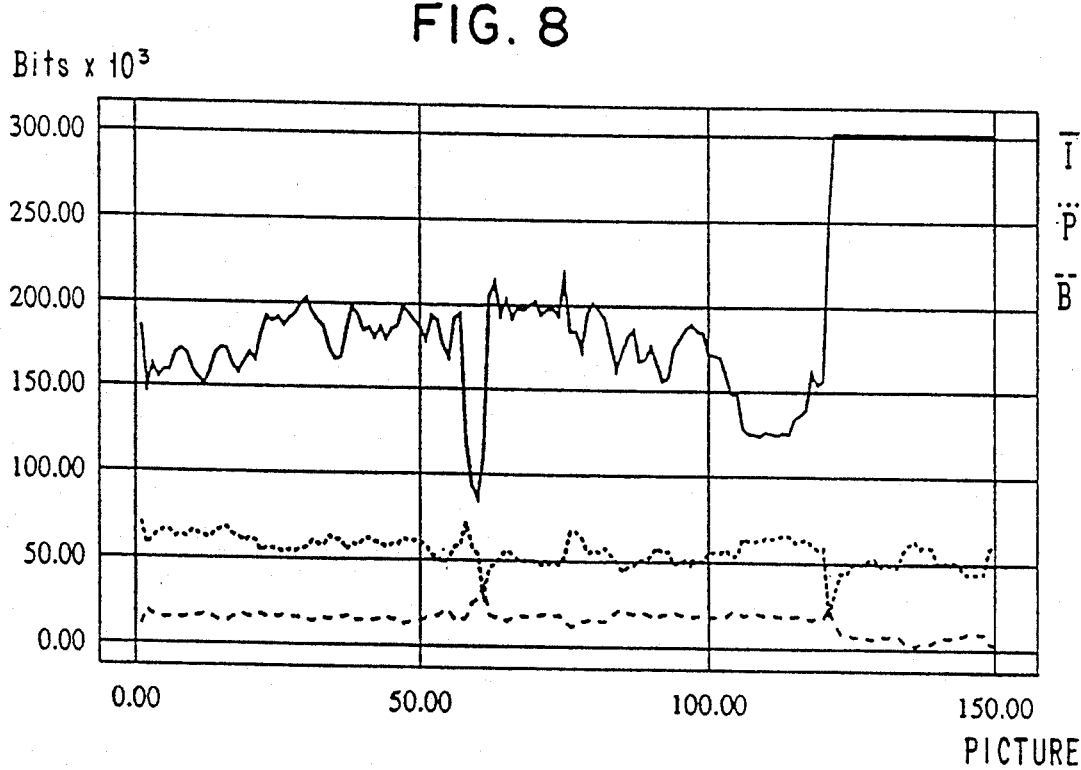
FIG. 8 depicts the bit allocations computed for each picture of the sequence of FIG. 7.

Two test sequences, the Flower Garden sequence and the Table Tennis sequence, used in the MPEG standards effort were employed to test the effectiveness of the techniques of the invention. Specifically, a video sequence composed of the first 60 frames of the Flower Garden sequence, followed by the first 60 frames of the Table Tennis sequence, followed by 30 repetitions of the 61-st frame of Tennis Table (to simulate a still scene) will be used throughout this description to illustrate the methods. These sequences are 352×240 pixel YUV test sequences. The coding was done at 1.15 Mbits/s with an I-picture spacing of N=15 and an anchor picture spacing of M=3. FIG. 7 shows the coding difficulty factors for the entire sequence, and FIG. 8 depicts the bit allocations computed for each picture.

Figure 9A:
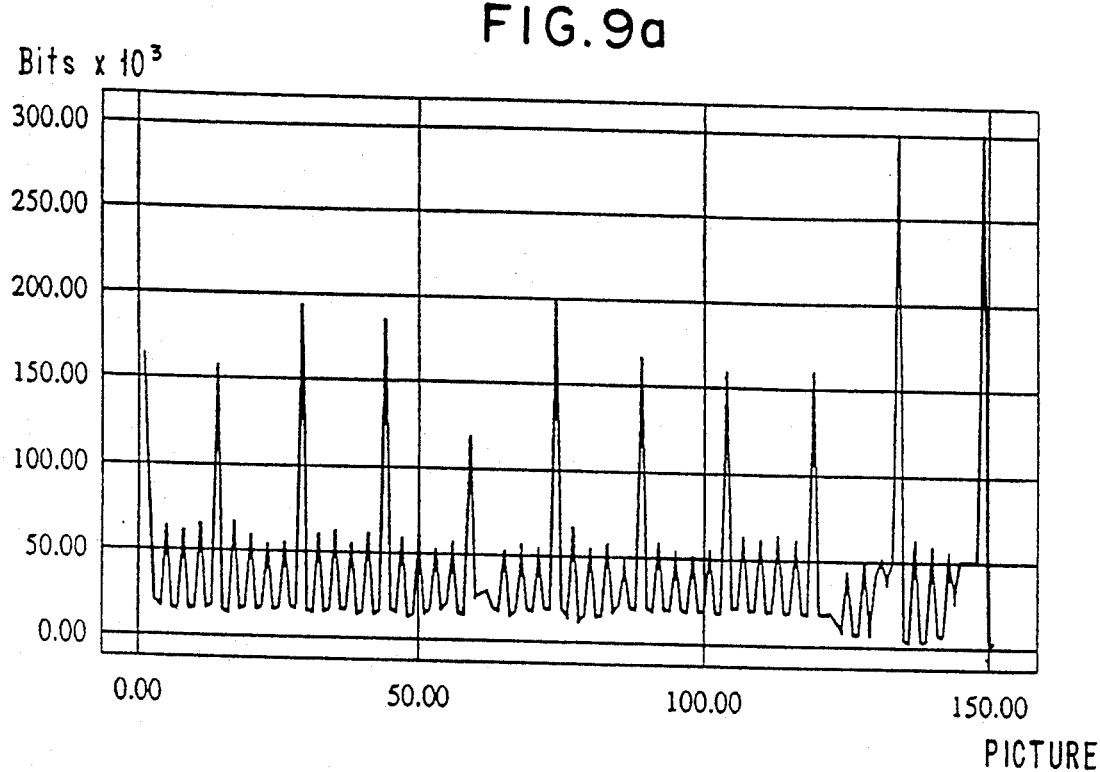
FIGS. 9a and 9b depict the target and actual bit-rates for each picture of the sequence of FIG. 7.
Figure 9B:
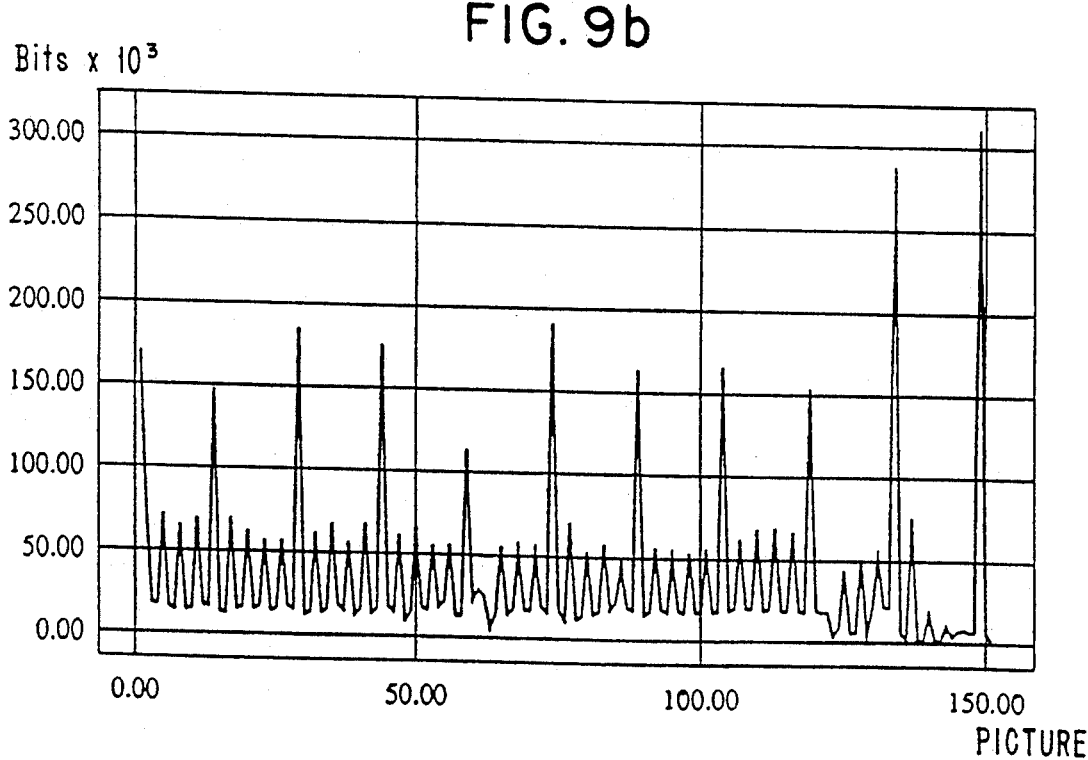

It should be noted that the three bit allocations shown for each picture in the sequence are those just prior to coding that picture, but that only one of these allocations is actually used. The target bit-rate resulting from the allocation method is shown along with the actual bit-rates for the sequence in FIG. 9.

Figure 10:
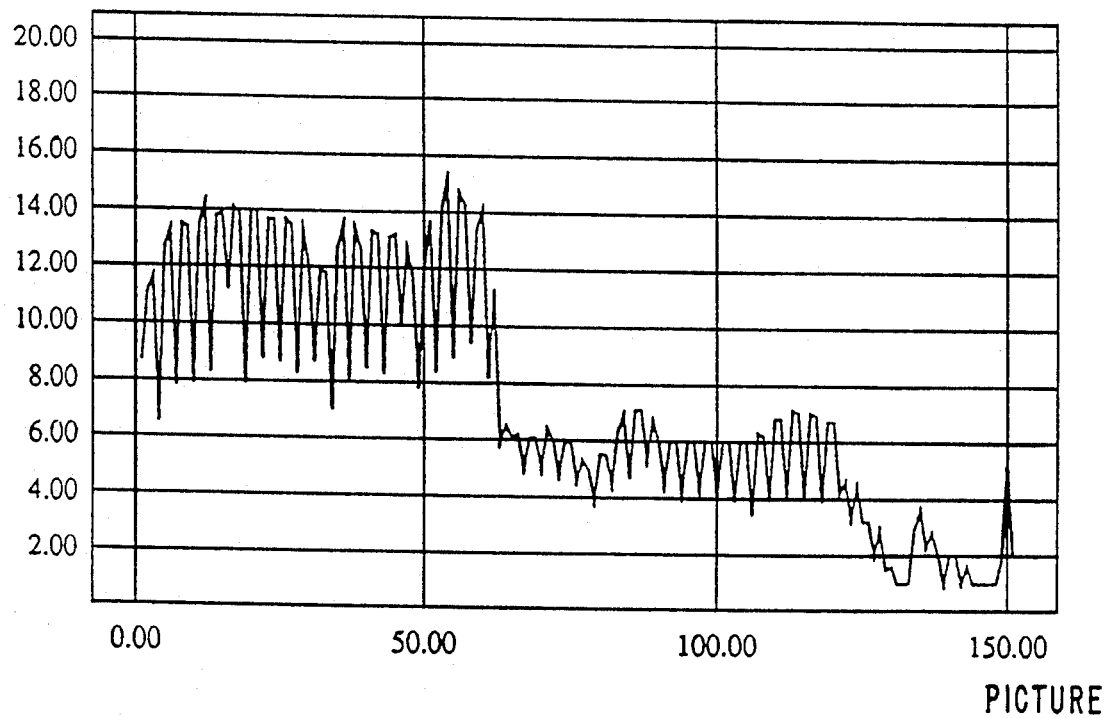
FIG. 10 is a plot of the quantization (QP) factors used to code the sequence of FIG. 7.

The stability at the scene change (frame 61) and the convergence of the actual bit-rate for P- and B-pictures to nearly zero will be noted in the still segment (frames 121-151). The quantization factors (QP) used to code the sequence are plotted in FIG. 10. Note also that I- and P-pictures are generally coded with a finer step size than B-pictures.

AQ/RC Picture Coder

Turning now to the AQ/RC Picture Coder 1, this subsystem involves procedures for the adaptive quantization (AQ) of the successive pictures of a video sequence to achieve improved visual quality, while ensuring that the number of bits used to code each picture is close to a predetermined target. Procedures are performed for I-pictures, P-pictures, and B-pictures. These procedures involve treating the spatial regions making up a picture using a region classification strategy which works in tandem with:

motion estimation;

an adaptive model of the number of bits required to code a picture region as a function of the quantization factor QP and measured characteristics of the region; and, a scheme for adapting the quantization level as a picture is coded to ensure that the overall number of bits produced is close to the predetermined target.

Although, for purposes of description here, the spatial regions will be treated as MPEG macroblocks (MB), it should be understood that the procedures described may be applied to regions of different sizes and shapes.

Figure 11:
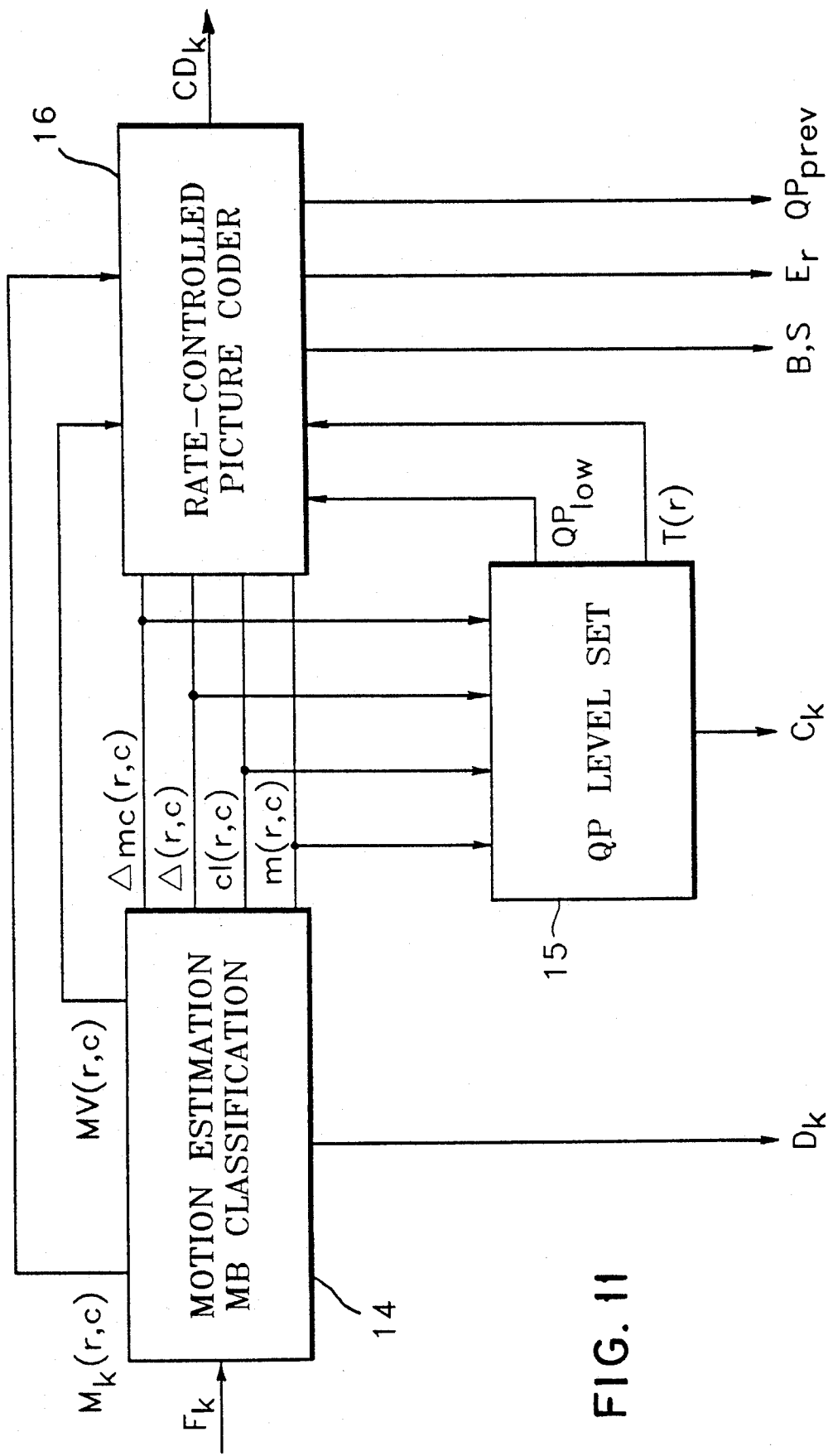
FIG. 11 is a block diagram showing in more detail the AQ/RC Picture Coder subsystem of FIG. 6.
Figure 12A:
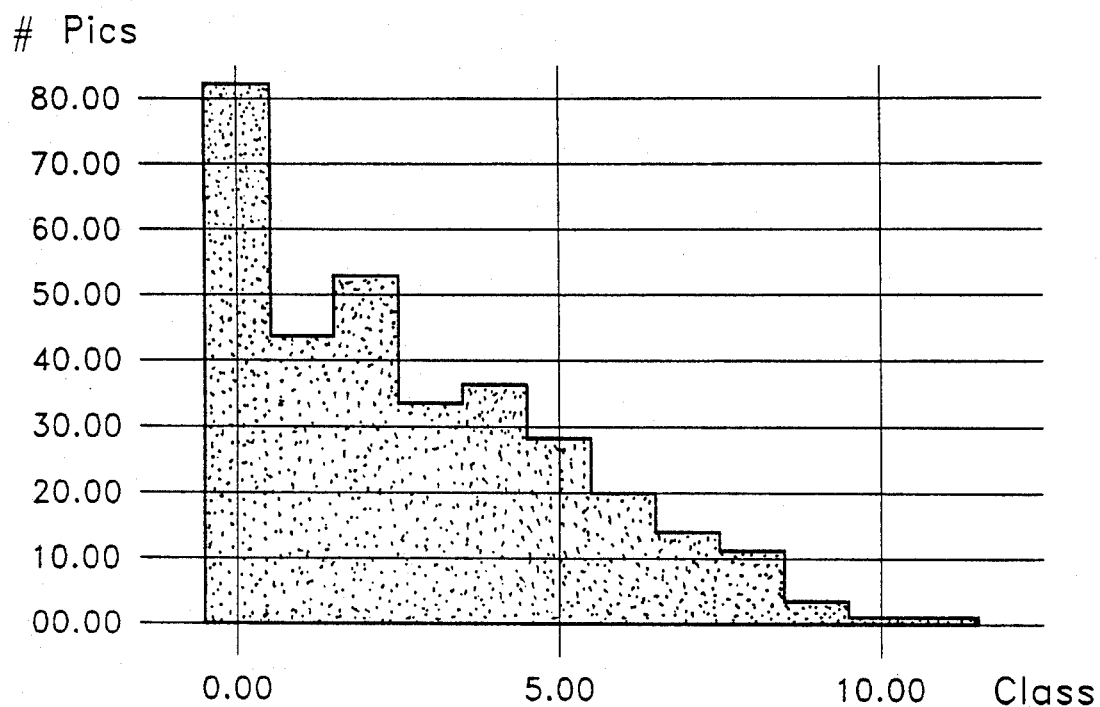
FIGS. 12a-12d depict typical class distributions for I- and P-pictures taken from both the Flower Garden and Table Tennis segments of the MPEG test sequences.
Figure 12B:
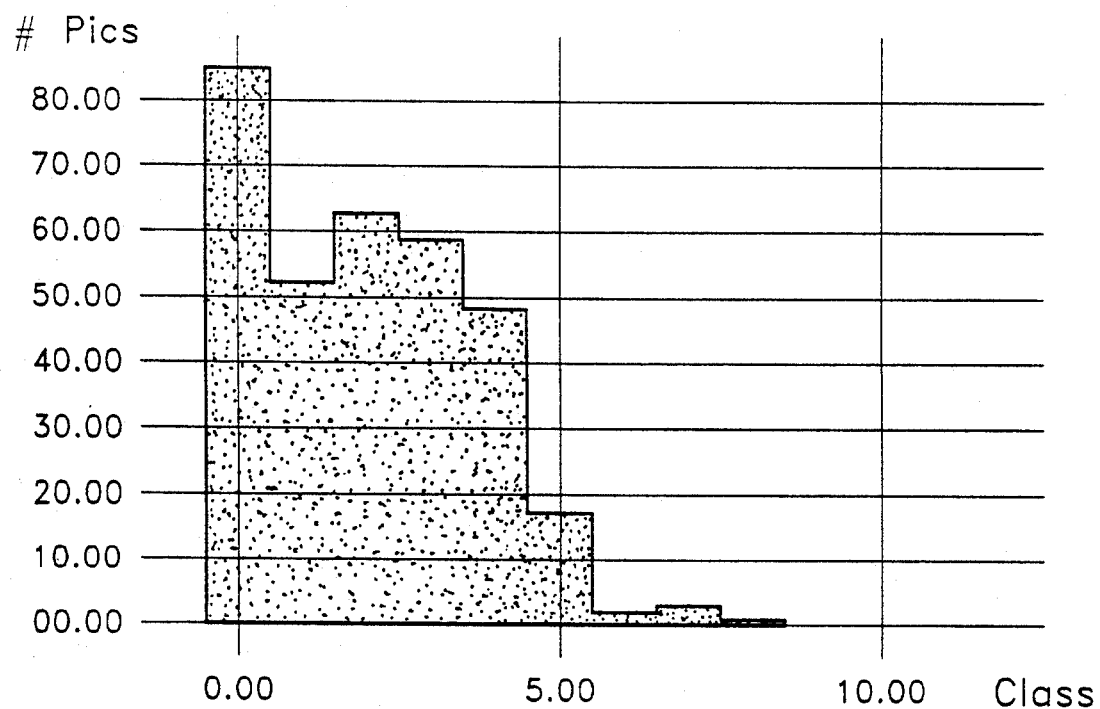
Figure 12C:
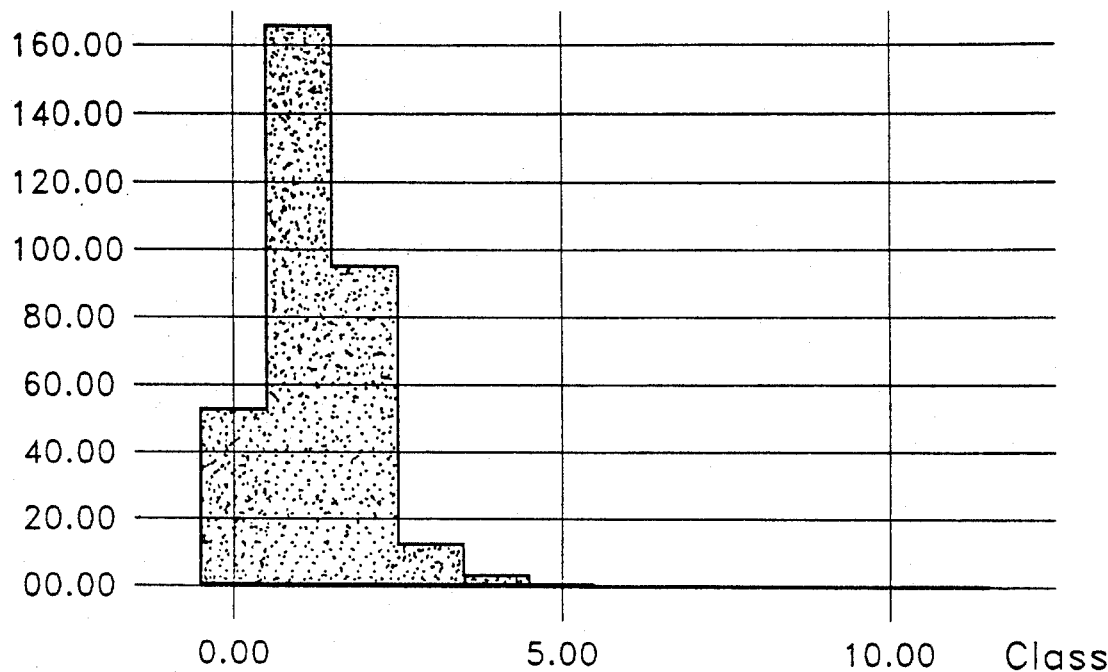
Figure 12D:
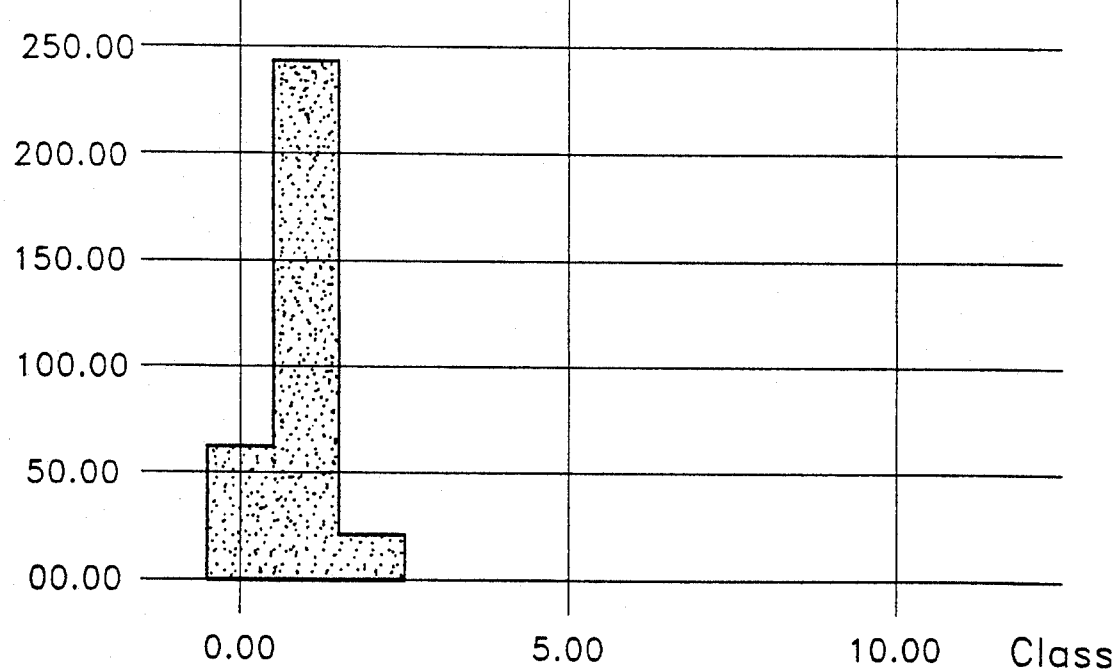
Figure 13A:
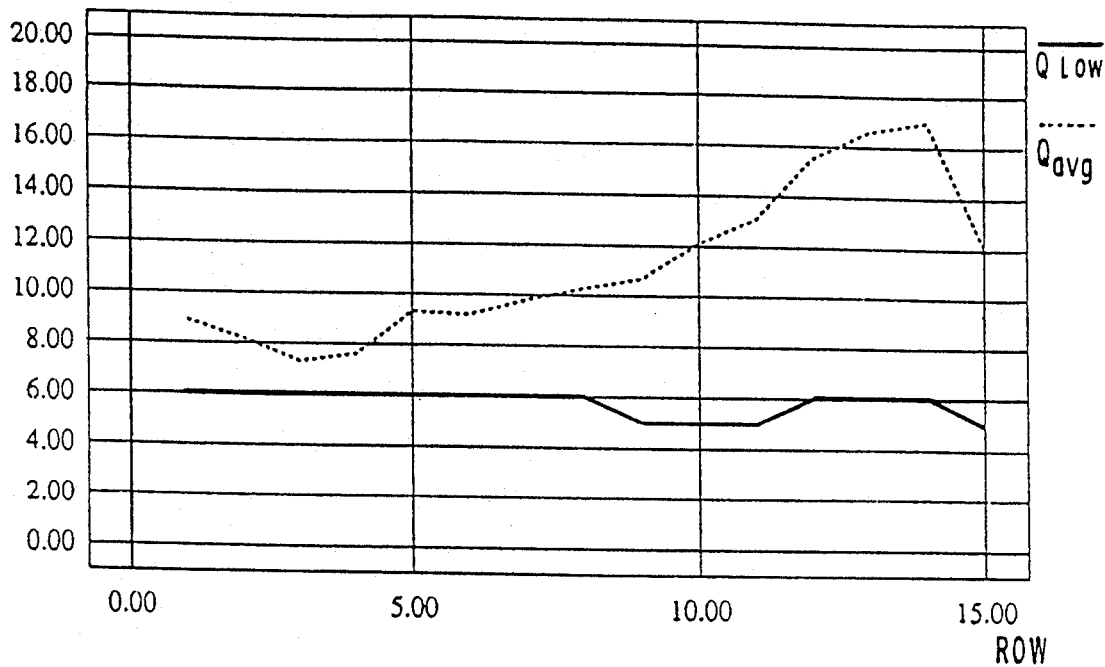
FIGS. 13a-13d and 14a-14d depict the performance of the QP assignment and update strategies in bit-rate control in accordance with the invention with FIG. 13 showing the $QP_{low}$ and average QP in each row of Frames 16, 22, 61, and 67 of a test sequence, and FIG. 14 showing the bits produced versus the targets on a row by row basis.
Figure 13B:
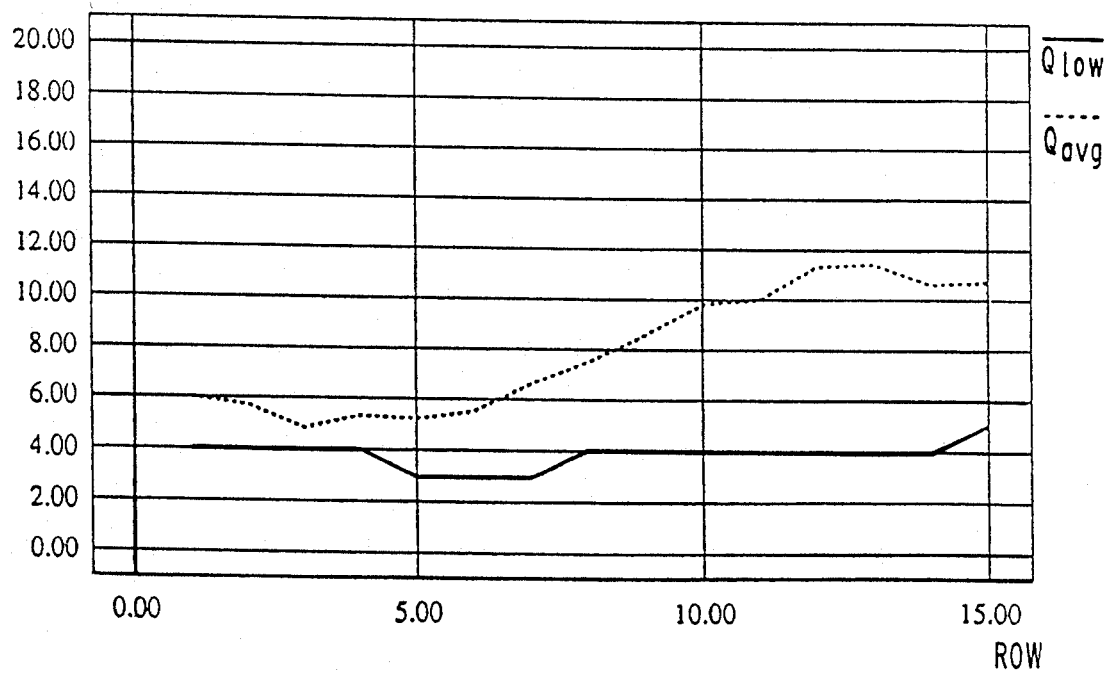
Figure 13C:
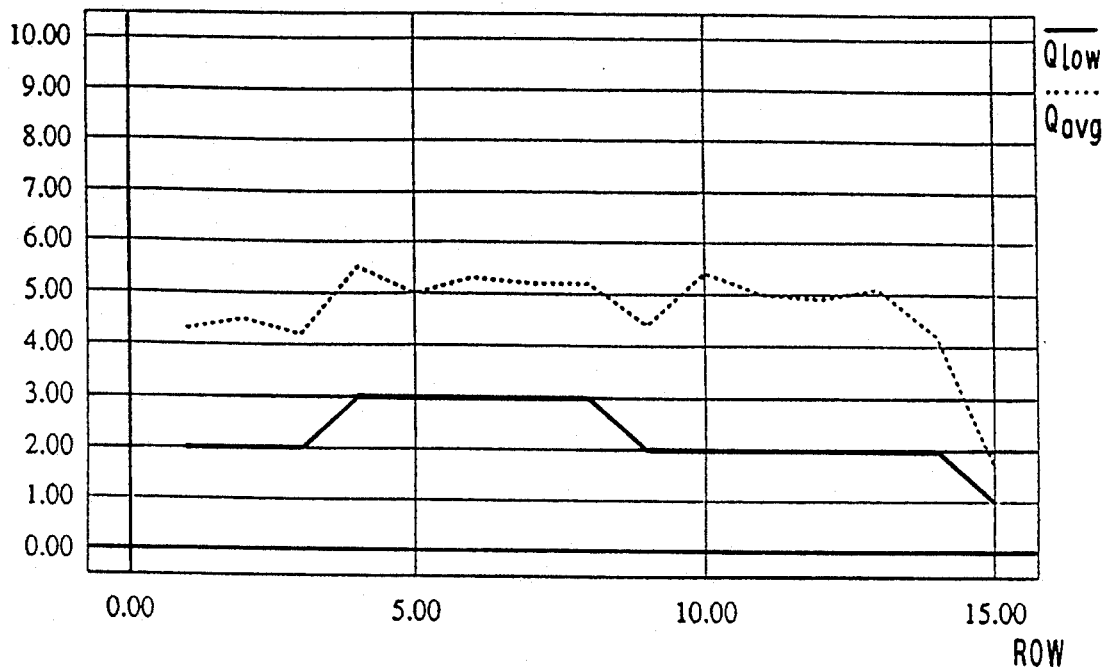
Figure 13D:
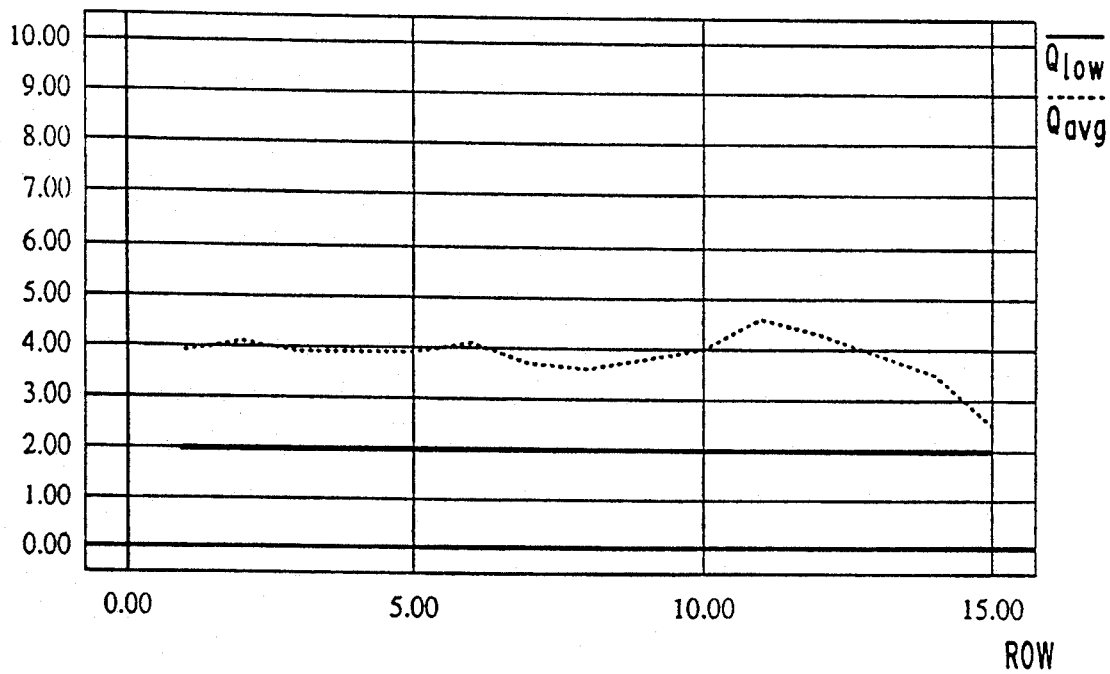
Figure 14A:
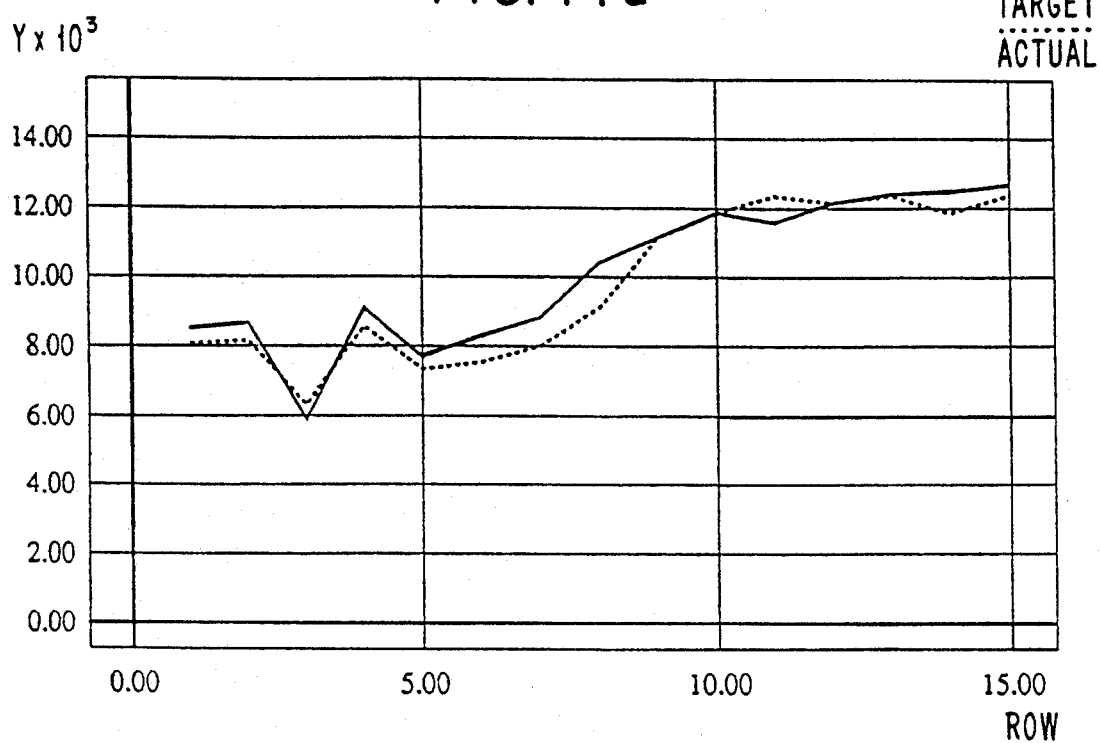
Figure 14B:
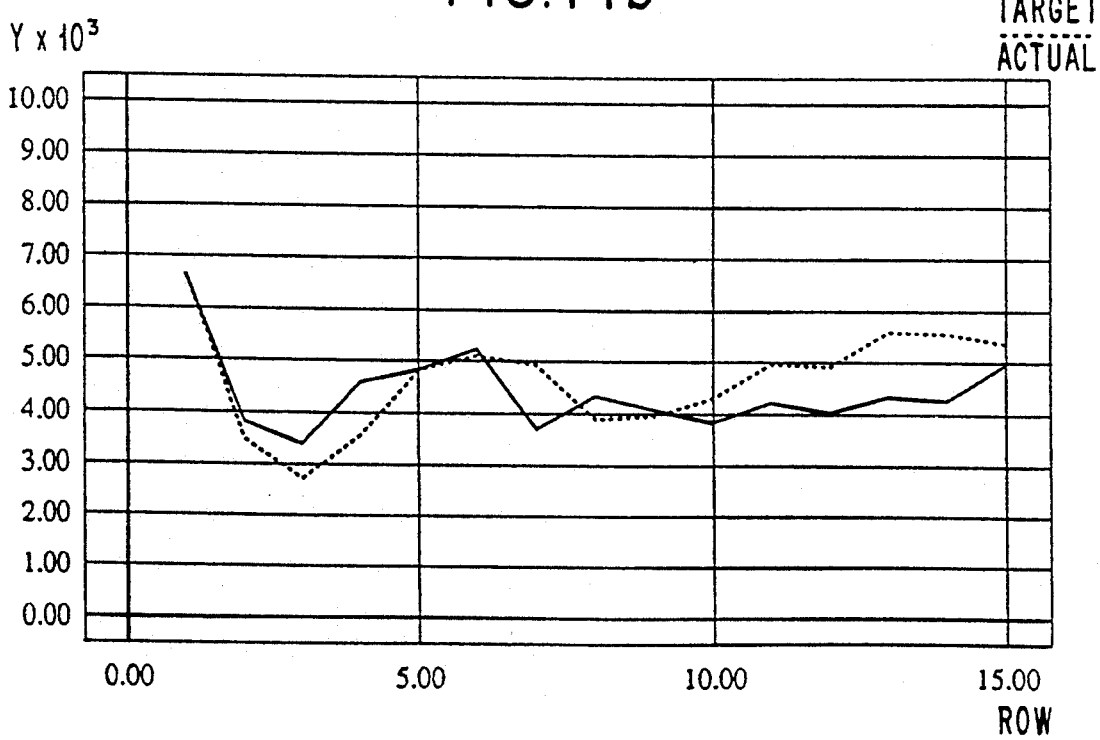
Figure 14C:
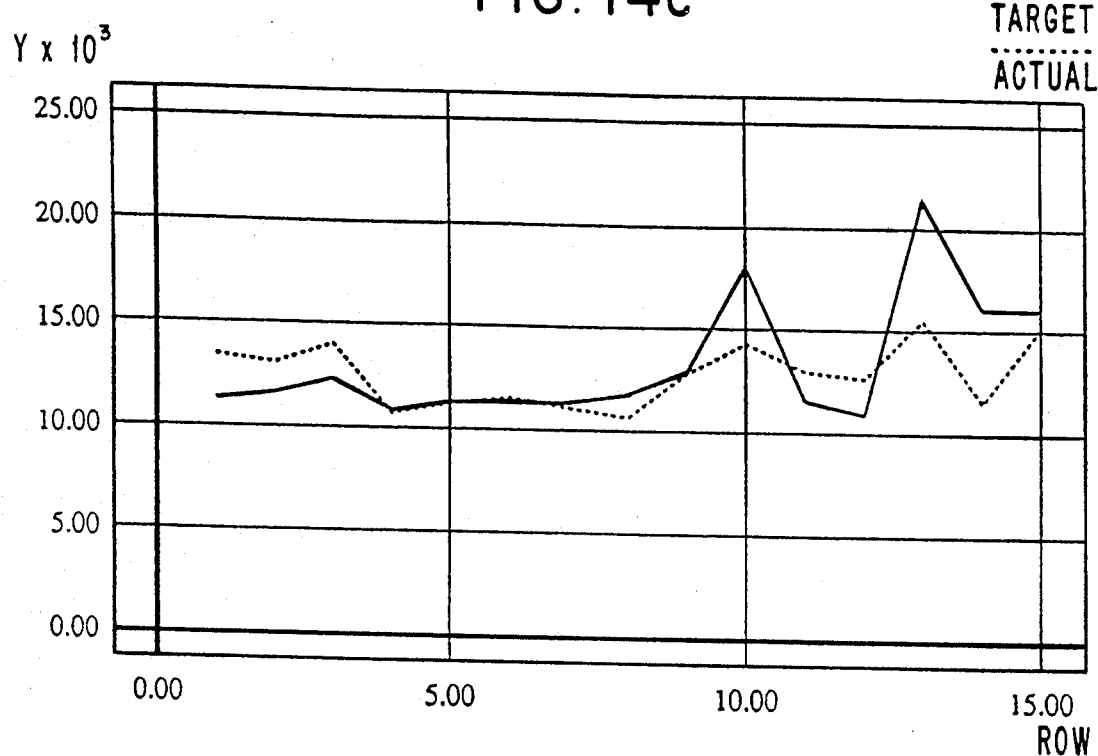
Figure 14D:
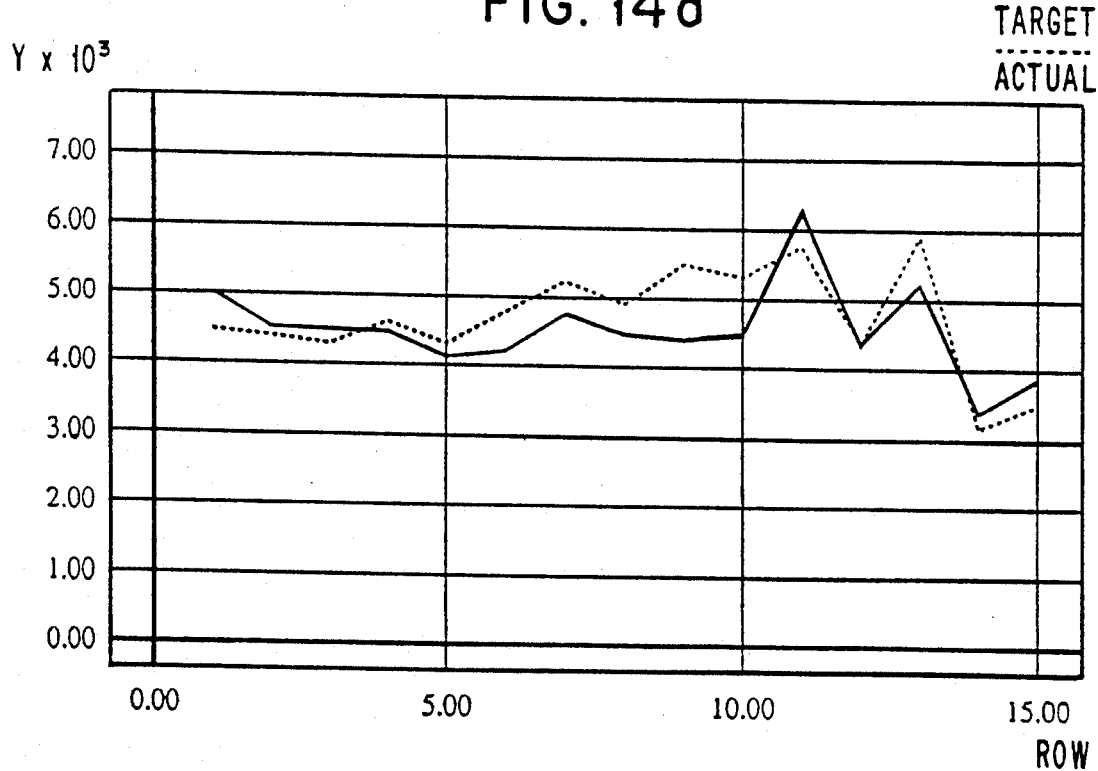

FIG. 11 generally illustrates the components of the AQ/RC Picture Coder 1. The operation of this subsystem depends on the type of picture being coded. As seen in the Figure, a video picture signal $F_k$, for a picture k, which may or may not have been preprocessed in the QP-adaptive Pre-processor 3, enters a Motion Estimation and MB Classification unit 14 of the AQ/RC Picture Coder 1. There, the signal is analyzed and each MB is classified according to procedures described below. If the picture is a P-picture or B-picture, motion estimation is also performed. Results of these operations in the form of a coding difficulty factor, $D_k$, are passed to the Picture Bit Allocation subsystem 2, for use as detailed above. The Picture Bit Allocation subsystem 2 then returns a bit allocation signal $C_k$ for picture k. This bit allocation signal is used by a QP-level Set unit 15, along with a set of information passed from the Motion Estimation and MB Classification unit 14, to determine initial values of the quantization factor QP to be used in coding each MB. Additionally, the QP-level Set unit 15 computes an estimate of the number of bits required to code each row of MB's in the picture. These quantization factors and row targets are passed to the Rate-controlled Picture Coder unit 16, which proceeds to code the picture, also using information passed from the Motion Estimation and MB Classification unit 14. Since the operation of the AQ/RC Picture Coder 1 is partitioned among three sub-units, the description that follows will follow the same partition while referring primarily to FIG. 11.

Motion Estimation and MB Classification Unit

One of the primary purposes of the Motion Estimation and MB Classification unit 14 is to determine which coding mode m(r,c) will be used to code each MB in a picture. This function is only used for motion compensated pictures, since there is only one mode for MB's in I-pictures: intramode. The mode decision relies on a motion estimation process, which also produces motion vectors and motion-compensated difference MB's. Another important function of the Motion Estimation and MB Classification unit 14 is to classify each MB. The class cl(r,c) of MB (r,c) will ultimately determine the value of the quantization factor QP(r,c) used to code that MB. The modes and classes are determined by analyzing each picture, and estimating the motion between the picture to be coded and the predicting picture(s). The same information is also used to compute the coding difficulty factor, $D_k$, which is passed to the Picture Bit Allocation subsystem 2.

The objective of motion estimation in the MPEG video coding algorithm is to obtain a motion vector mv(r,c)=($r_{mv}$, $c_{mv}$) and the associated motion-compensated difference MB $M_k$(r,c). The motion-compensated difference MB is the pixel-wise difference between the current MB under consideration and the predicting MB. The exact method for forming the prediction MB depends on the motion compensation mode employed, and is detailed in the above-noted ISO-IEC JTC1/SC2/WG11 MPEG CD-11172, MPEG Committee Draft, 1991. The motion vector should, in some sense, be indicative of the true motion of the part of the picture with which it is associated. Details of motion estimation techniques can be found in A.N. NETRAVALI AND B. G. HASKELL, *Digital Pictures: Representation and Compression* New York, N.Y.: Plenum Press, 1988.

For purposes of the present description, it will be assumed that a full search motion estimation algorithm was used covering a range of $\pm 7 \times n$ pixels in the horizontal and vertical directions, where n is the distance in picture intervals between the picture being analyzed and the predicting picture, and where the motion vectors are accurate to half a pixel. The present invention involves techniques for using the results of motion estimation to code video sequences, but is not limited to use with any specific motion estimation techniques, and can be used with any motion estimation method, provided that a measure of the success of motion compensation (motion compensation error), that a measure of the success of motion compensation (motion compensation error), that indicates how good the match is between the MB being compensated and the predicting region pointed to by the motion vector, can be made available. It will be recalled that for P-pictures, there is one type of motion estimation (forward-in-time), and for B-pictures there are three types (forward-in-time, backward-in-time, and interpolative-in-time). The forward motion vector for MB (r,c) may be denoted as $mv_f(r,c)$, and the backward motion vector as $mv_b(r,c)$. The interpolative mode uses both forward and backward vectors. The forward, backward, and interpolative motion compensation errors may be denoted as $\Delta_{mc,f}(r,c)$, $\Delta_{mc,b}(r,c)$, and $\Delta_{mc,i}(r,c)$, respectively.

In addition to the motion compensation error(s), a measure of the spatial complexity of each MB is needed. Denote this measure as $\Delta(r,c)$. It is important that $\Delta(r,c)$, $\Delta_{mc,f}(r,c)$, $\Delta_{mc,b}(r,c)$, and $\Delta_{mc,i}(r,c)$, are like measures, in the sense that numerical comparison of them is meaningful. In the preferred embodiment, these measures are all defined to be mean absolute quantities, as indicated below. Labeling each MB by its row and column coordinates (r,c), denotes the luminance values of the four 8×8 blocks in MB (r,c) by $y_k(i,j)$, i=0, ..., 7, j=0, ..., 7, k=0, ..., 3 and the average value of each 8×8 block by $dc_k$. Then, the spatial complexity measure for MB (r,c) is taken to be the mean absolute difference from DC, and is given by $$\Delta(r,c) = \frac{1}{4} \sum_{k=0}^{3} \Delta_k(r,c),$$

where $$\Delta_k(r,c) = \frac{1}{64} \sum_{i=0}^{7} \sum_{j=0}^{7} |y_k(i,j) - dc_k|.$$

The like motion compensation error is the mean absolute error. Denoting the four 8×8 blocks in the predicting MB by $p_k(i,j)$, i=0, ..., 7, j=0, ..., 7, k=0, ..., 3, this is defined by $$\Delta mc(r,c) = \frac{1}{4} \sum_{k=0}^{3} \left[ \frac{1}{64} \sum_{i=0}^{15} \sum_{j=0}^{15} |y_k(i,j) - p_k(i,j)| \right].$$

In the preferred embodiment of the invention, the coding difficulty factors passed to the Picture Bit Allocation subsystem 2 are based completely on the above measures of spatial complexity and motion compensation error. For I-pictures, the total difficulty factor is $$D_I = \sum_r \sum_c \Delta(r,c).$$

For P-pictures and B-pictures, the coding mode is first decided upon, and the measure associated with that mode is used in a summation similar to the one above. The following modes being possible:

|  |  |
| --- | --- |
| intramode: | $m(r,c) = 1$, |
| forward mc: | $m(r,c) = mc_f$, |
| backward mc: | $m(r,c) = mc_b$, |
| interpolative mc: | $m(r,c) = mc_i$. | the difficulty factors are computed by $$D_P = \sum_{m(r,c)=1} \Delta(r,c) + \sum_{m(r,c)=mc_f} \Delta_{mc_f}(r,c),$$

and $$D_B = \sum_{m(r,c)=I} \Delta(r,c) + \sum_{m(r,c)=mc_f} \Delta_{mc_f}(r,c) + \sum_{m(r,c)=mc_b} \Delta_{mc,b}(r,c) + \sum_{m(r,c)=mc_i} \Delta_{mc,i}(r,c).$$

Many possible rules can be used to decide which mode to employ. In the preferred embodiment, the following rule is used for P-pictures.

$$m(r,c) = \begin{cases} I & \Delta(r,c) < \beta \Delta_{mc_f}(r,c), \\ mc_f & \Delta(r,c) \geq \beta \Delta_{mc_f}(r,c). \end{cases}$$

A value of $\beta=1.0$ is used. In the preferred embodiment, the mode selection rule used for B-pictures is: the mode with the lowest $\Delta(r,c)$ is used to code the MB. It is to be appreciated that, although mean absolute quantities were used as the measures of coding difficulty in the preferred embodiment, any like measures (for example, mean square quantities) could also be used.

It is intended that the measures used to determine MB modes and compute coding difficulties could be by-products of the motion estimation procedure. This is possible, in part, because the measures described above are often used to find the best motion vector in motion estimation procedures.

These measures are also used to classify macroblocks. In the preferred embodiment, the MB's are classified as follows. The class of all intramode MB's is computed by quantizing the minimum value of $\Delta_k(r,c)$ for that MB. Defining a threshold t, the class cl(r,c) of MB (r,c) is given by $$cl(r,c) = \frac{\min_k [\Delta_k(r,c)]}{t}.$$

After a motion compensation mode has been chosen for motion compensated MB's, they are classified according to:

$$cl(r,c) = \frac{\min\left[\min_k[\Delta_k(r,c)], \Delta_{mc}(r,c)\right]}{t}.$$

A value of $t=2$ is used in the preferred embodiment. Note that both intramode and motion compensated measures are used to classify motion compensated MB's. The mode and class information is used, along with the underlying measures, by the QP-level Set unit 15 to determine an initial quantization level, and by the RC Picture Coder unit 16 during coding.

Typical class distributions for I- and P-pictures taken from both the Flower Garden and Table Tennis segments of the sequence are shown in FIG. 12.

To keep computational complexity low in the preferred embodiment, B-picture MB's are not classified, the Q-level Set unit 15 is not used, and the coding scheme employed in the RC Picture Coder unit 16 is simpler than that used for I-pictures and P-pictures.

QP-Level Set Unit

The function of the QP-level Set unit 15 is to compute an initial value for the quantizer step size for each class. All MB's in a given class are assigned the same quantization step size. In the preferred embodiment, the quantization step size for each class relative to an overall minimum step size is assigned according to:

$$QP(r,c) = QP_{low} + \Delta QP \times cl(r,c).$$

Values of $\Delta QP$ that have been used in the preferred embodiment are 5 and 6. Note that the allowed range for $QP_{low}$ in the preferred embodiment is $-31, \ldots, 31$, although MPEG only allows for integer values of $QP(r,c)$ in the range of $1, \ldots, 31$. Therefore, whenever the above formula produces a value above 31, it is clipped to 31, and any values which fall below 1 are clipped to 1. It is beneficial to allow $QP_{low}$ to be less than 1 to ensure that the finest quantizer step sizes can be applied to MB's of all classes, if the bit-rate warrants it. The process for selecting the initial value $QP_{low}^{init}$ of $QP_{low}$ is explained below.

The underlying model of human perception of coding errors used in the preferred embodiment, as reflected in the method for computing the class cl(r,c) of each MB and for computing QP(r,c), given cl(r,c), is that like-magnitude errors are more visible in less active regions of a picture. While this model is clearly an over-simplification, it is a reasonable compromise between visual quality and computational burden. The rationale behind using the minimum $\Delta_k$ over the four luminance blocks in the MB for classification, rather than the $\Delta$ of the entire block, is that MB's with any smooth regions should be assigned a low quantizer step size.

The MB modes m(r,c) and classes cl(r,c) are used along with the $\Delta(r,c)$ and $\Delta_{mc}(r,c)$ values and the target bit-rate for the picture transform coefficients to set the initial quantizer low value $QP_{low}$. A model has been developed in accordance with the invention which predicts the number of bits required to code the transform coefficients of an MB, given the quantization value to be used and $\Delta$ (in the case of intramode MB's) or $\Delta_{mc}$ (for motion-compensated MB's). Experimental data leads to a model of the form:

$$B_I(QP,r,c) = a_I \Delta(r,c) QP^{b_I}$$

for intramode MB's and $$B_{mc}(QP,r,c) = a_P \Delta_{mc}(r,c) QP^{b_P}$$

for motion-compensated MB's. The exponents are $b_I = -0.75$ and $b_P = -1.50$. However, these values depend strongly on the particular quantization weighting values $w_{mn}$ being used, and should be optimized to match them.

To estimate appropriate values for the a and b parameters, the following experimental approach has been taken. Consider the case of the I-picture model, for which it is desired to estimate $a_I$ and $b_I$. Because the parameters of the model to track changes from picture to picture are to be adapted, the primary interest will be the model's accuracy relative to an individual picture, rather than an ensemble of pictures. Accordingly, a representative picture is encoded several times, using a different value of the QP quantizer step size for each pass. The number of bits required to code each MB at each value of QP is measured. Next, for each value of QP, the number of bits required to code all MB's having a given value of $\Delta$ is averaged. The result is a two-dimensional data set which indicates the average number of bits required to code MB's as a function of the $\Delta$ value of the MB and the QP step size used to code it. These average values may be denoted as $B_{ij} = B(QP_i, \Delta_j)$. It is desired to fit these measured values to an equation of the form:

$$B_{ij} = a_I \times \Delta_j \times (QP_i)^{b_I}.$$

This is an overdetermined set of nonlinear equations in $a_I$ and $b_I$, and can be solved using nonlinear least squares methods. In order to linearize the problem logarithms of both sides of the equation are taken. This results in an easily solved linear least squares problem in $\log(a_I)$ and $b_I$.

The linear parameters $a_I$ and $a_P$ should be adjusted after coding each I- or P-picture, to track the dynamically changing characteristics of the video sequence. This can be done according to a method which will be described in detail in the description of the RC Picture Coder unit 16 below. (For intramode MB's, this model can be improved by adding an additional term to account for the number of bits required to code the DC terms in the MB, since the coding for DC coefficients is handled separately.)

The predicted number of bits required to code the transform coefficients for the entire picture according to these bit-rate models is $$B(QP_{low}) = \sum_r \sum_c B_I[QP(r,c), r,c]$$

for I-pictures and $$B(QP_{low}) = \sum_{m(r,c)=I} B_I[QP(r,c), r,c] + \sum_{m(r,c)=mc_f} B_{mc}[QP(r,c), r,c]$$

for P-pictures, where QP(r,c) is computed according to $$QP(r,c) = QP_{low} + \Delta QP \times cl(r,c).$$

The initial value for $QP_{low}$ is taken as that value of QP for which B(QP) is closest to the picture transform coefficient allocation C:

$$QP_{low}^{init} = \underset{QP}{\operatorname{argmin}} |B(QP) - Cn|.$$

In the preferred embodiment, a half-interval search is conducted between $-31$ and $31$ to find $QP_{low}^{init}$. The role of the upper and lower bounds on QP in this procedure is subtle. While an upper bound of 31 is sufficient to guarantee that the encoder can operate with the coarsest possible quantization allowed by the standard, a larger upper bound will change the performance of the rate control algorithm, as will be described below in greater detail, by making it more sensitive to the overproduction of bits. Similar properties hold for the lower bound on QP.

Once $QP_{low}$ has been determined, the QP-level Set unit 15 computes the expected number of bits required to code row r of MB's using $QP_{low}$, by $$T(r) = \sum_c B_I[QP(r,c), r,c] + \frac{C - B(QP_{low})}{N_{row}} + \frac{S}{N_{row}},$$

where $N_{row}$ is the number of rows of MB's. The second term in this expression accounts for the difference between the number of bits predicted by the model at $QP_{low}$ and the actual transform coefficient allocation C, and the third term accounts for each row's share of the side information allocation S. The sum of the targets T(r) over all the rows yields the total picture allocation A. These expected values become target row bit-rates for the RC Picture Coder unit 16.

Rate-controlled Picture Coder

Picture coding proceeds by indexing through the MB's and coding each according to the mode and quantizer step sizes determined in the previous steps. However, because of mismatches in the bit-rate model and the continual changing of the contents of a sequence, the actual number of bits produced will not exactly match the expected number. It is desired to control this deviation, not only to keep the actual bits produced for the picture close to the target, but also to prevent violation of the VBV bit-rate limitations. A rate control feedback strategy has been developed in accordance with the invention which updates $QP_{low}$ at the end of each row of MB's. A number of factors determine the update. One factor is that different rows of MB's in a picture are not expected to produce the same number of bits, because of variations in $\Delta(r,c)$ and $\Delta_{mc}(r,c)$, as well as assigned quantizer step sizes. At the end of each row, the number of bits produced is compared to the expected number T(r) computed in the QP-level Set unit 15. Another factor which plays a role in updating $QP_{low}$ is the closeness of both the picture allocation and the actual number of bits produced to the VBV limits. The gain of the $QP_{low}$ update as a function of bit-rate deviations is a function of the proximity of the VBV limit in the direction of the error. Minor deviations from the predicted bit-rate cause little or no change in $QP_{low}$, while deviations which bring the picture bit-rate close to one or the other of the VBV limits cause the maximum possible adjustment in $QP_{low}$. Such a strategy is quite successful in preventing VBV violations, hence, avoiding undesirable actions like the dropping of coded data or the stuffing of junk bytes into the bit stream.

The following equations describe the update procedure for $QP_{low}$, as implemented in the preferred embodiment. Denoting the total number of bits used to code row m and all preceding rows by B(m), and the difference between B(m) and the cumulative target as $\Delta B(m)$:

$$\Delta B(m) = B(m) - \sum_{r=1}^{m} T(r).$$

After coding row m, $QP_{low}$ is updated if $\Delta B(m) \neq 0$ as follows:

$$QP_{low} = \begin{cases} QP_{low}^{init} + \dfrac{QP_{low}^{init} + 31}{\Delta l} \Delta B(m) & \Delta B(m) < 0, \\ QP_{low}^{init} + \dfrac{31 - QP_{low}^{init}}{\Delta u} \Delta B(m) & \Delta B(m) > 0, \end{cases}$$

where $\Delta u$ and $\Delta l$ are the differences between the picture allocation A and the upper and lower VBV limits for picture n, respectively:

$$\Delta u = U^{VBV} - A,$$

$$\Delta l = \max(0, L^{VBV}) - A.$$

This strategy updates $QP_{low}$ based on the total bit allocation error up to the current row, as it relates to the maximum error allowed according to the VBV criterion.

After each I- or P-picture is coded, new bit-rate model parameters ($a_I$ and $a_P$) are computed so that the bit-rate model will agree with the number of transform coefficient bits actually produced ($C_a$). To illustrate this for the I-picture case, during the course of coding each picture, the sum of all $\Delta(r,c)$ for MB's coded with each value of QP is generated:

$$S\Delta(QP) = \sum_{QP(r,c)=QP} \Delta(r,c).$$

$$QP = 1, \ldots, 31.$$

An updated value of $a_I$ is computed by $$a'_I = \frac{C_a}{\sum_{QP=1}^{31} [S\Delta(QP) \times QP^{b_I}]}$$

and $$a_I = (1 - \alpha)a_I + \alpha a'_I.$$

A value of $\alpha = 0.667$ may be used in the implementation. A similar strategy is used to update both $a_I$ and $a_P$ after coding a P-picture. In that case, $\alpha$ is proportional to the fraction of MB's coded in the mode corresponding to the bit-rate model parameter being updated.

Finally, the number of bits used to code all side information for the picture is stored for use as the value of the side information allocation S for the next picture of the same type.

The performance of the QP assignment and update strategies is depicted in FIGS. 13 and 14. FIG. 13 shows the $QP_{low}$ and average QP in each row of frames 16, 22, 61, and 67 of the test sequence. It should be understood that, if the initial guess for $QP_{low}$ and the bit-rate models were exact, there would never be any change in $QP_{low}$ from row to row. However, $QP_{avg}$ would fluctuate depending on the spatial activity and motion compensability of the different rows in the pictures. For instance, it can easily be seen, from the I-picture QP values, that the lower half of the rows of the Flower Garden segment is far more complex spatially than the upper half. The P-picture results show that motion compensation reduces the variation in $QP_{avg}$, and FIG. 14 shows the bits produced versus the targets on a row by row basis. The results can be seen to track the targets reasonably well.

The rate control method for B-pictures differs from that of I- and P-pictures. No MB classification has been done, and hence no attempt is made to estimate the amount of compressed data each row of MB's will produce. Thus all row targets in a picture are the same. At the start of each picture, the quantizer factor is set equal to the value it had at the end of the previous B-picture. After each row of MB's, QP is updated in much the same fashion as for the other picture types, but with the upper and lower bounds determined by $$\Delta u = \max(U^{VBV} - A, A),$$

$$\Delta l = \max(0, L^{VBV}) - A.$$

The foregoing presents a motion video coder procedure which uses adaptive bit allocation and quantization to provide robust, high quality coded sequences over a range of source material and bit-rates. The coded data adheres to the fixed-bit-rate requirements of the ISO/IEC MPEG video coding standard. The additional coder complexity required to implement the adaptive techniques is modest with respect to the basic operations of motion estimation, discrete cosine transforms, quantization, and Huffman coding, which are part of a basic coder. These features make the algorithm suitable for flexible, real-time video codec implementations.

Adaptive Pre-Processing of Video Sequences

The operation of the QP-adaptive Pre-processor 3 of the invention is based on the observation that, under certain conditions, more visually pleasing images are produced by low bit-rate coders when the input pictures have been pre-processed to attenuate high-frequency information and/or to remove noise, which is inefficient to code, but visually less significant than low-frequency noise-free information. Specifically, when sequences contain regions of non-negligible size which are spatially very complex, or if noise has been introduced for some reason, an inordinate number of bits is required to represent the high-detail regions and noise accurately, leading to an overall degradation in visual quality. This degradation often takes the form of visually distracting, flickering noise-like artifacts. It is often a good trade-off to reduce the high-frequency content by preprocessing such as linear or non-linear filtering, which makes the images look less like the original, but which allows for better rendition of the low-frequency information without distracting artifacts. On the other hand, many sequences are such that the visual quality at low bit-rates is quite acceptable without any need to reduce the high-frequency information and noise. In cases such as this, pre-processing introduces degradations unnecessarily. Thus, it is desirable to be able to pre-process or not to pre-process, depending on the need.

One important indicator of the need for pre-processing is the quantization level required to code the sequence at the target bit-rate. The main advantage of using information about the quantization factor to control the amount of pre-processing is that it is independent of the bit-rate. Generally speaking, if the quantization level is very high (implying coarse quantization and hence poor quality reconstruction) much of the time, the reason is that the scene is too complex to code accurately at the target bit-rate.

Figure 15:
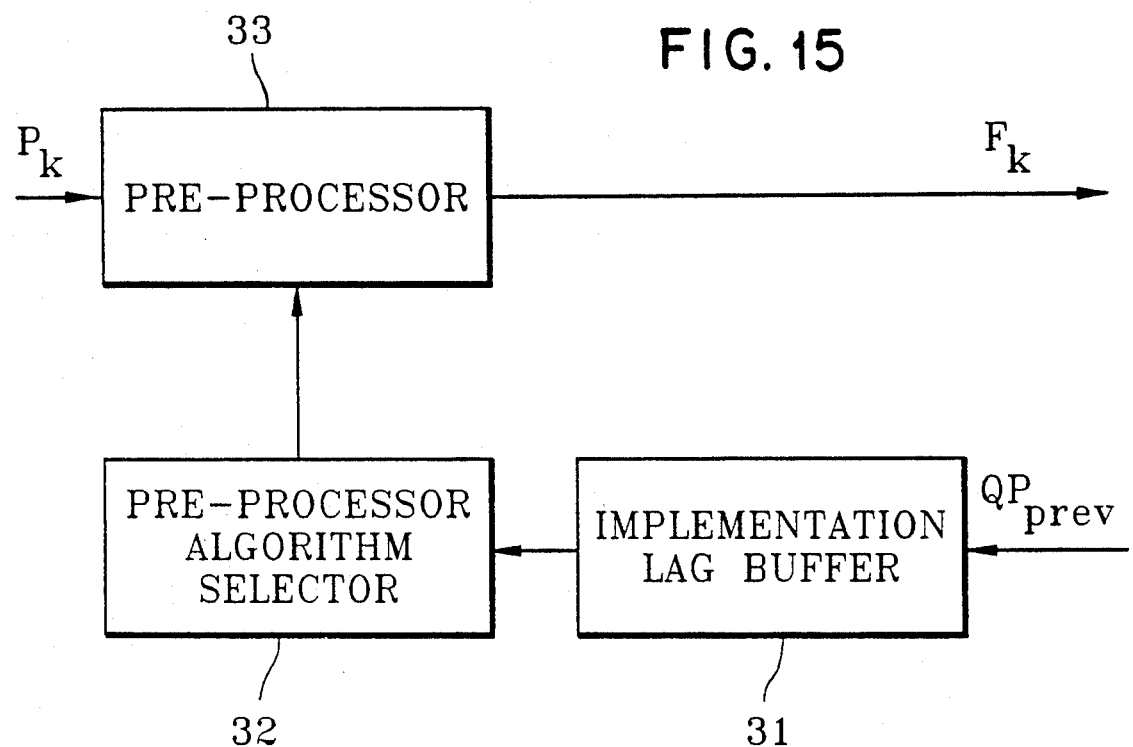
FIG. 15 depicts the details of the QP-Adaptive Preprocessor shown in FIG. 6.
Figure 16:
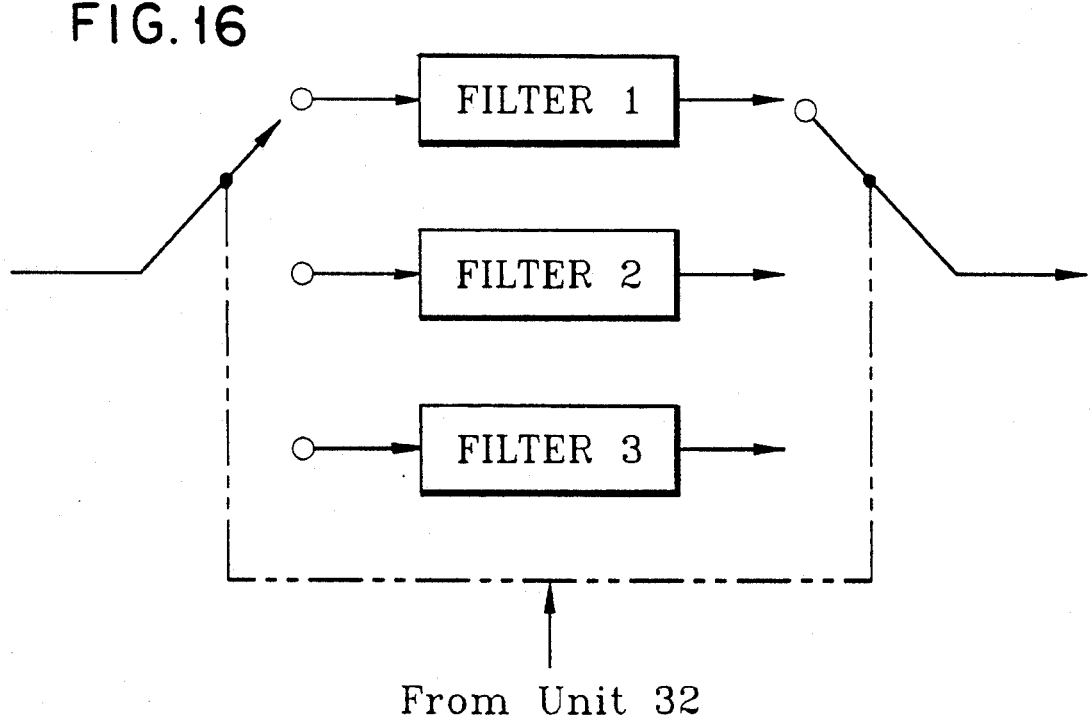
FIG. 16 depicts three possible filter state (FS) of the QP-Adaptive Pre-processor shown in FIG. 15.

The general operation of the third subsystem of the invention will be described with reference to FIG. 6 along with reference to the components of the QP-Adaptive Pre-processor 3 generally shown in FIG. 15 and a preferred operational embodiment shown in FIG. 16. As described above in connection with the operation of the AQ/RC Picture Coder 1, as each picture is coded, a previous quantization factor, $QP_{prev}$, used to quantize the transform coefficients is computed. This quantization level can depend on many things, including the number of MB's of each type in the picture, the number of bits allocated to the picture by the Picture Bit Allocation subsystem 2, and the overall complexity of the picture. The average QP used to code a picture is often a good quantity to use for $QP_{prev}$. After coding of each picture is complete, $QP_{prev}$ is passed to the QP-Adaptive Pre-processor 3 from the AQ/RC Coder 1. Based on the values of $QP_{prev}$ from possibly more than one previous picture, one of several pre-processors is selected to be applied to all pictures starting at some point in the future, and continuing until a new value of $QP_{prev}$ from a later picture causes another change in the pre-processor. As seen in FIG. 15, the $QP_{prev}$ signal is received in an Implementation Lag Buffer 31 and passed to a Pre-processor Algorithm Selector unit 32 which controls switching of the signal to a Pre-processor unit 33.

The Pre-processor unit 33 can consist of a set of filters, Filter 1, Filter 2, ..., Filter n. One preferred implementation of Pre-processor unit 33 is shown in FIG. 16 wherein the preprocessor filters are purely linear, and there are three possible filter states (FS):

1. $FS = 0$ No filter.

2. $FS = 1$ Separable 3 tap $FIR$ filter with coefficients $\left( \frac{1}{16}, \frac{7}{8}, \frac{1}{16} \right)$.

3. $FS = 2$ Separable 3 tap $FIR$ filter with coefficients $\left( \frac{1}{8}, \frac{3}{4}, \frac{1}{8} \right)$.

One algorithm useful for updating the filter states under the control of units 31 and 32 is as follows:

$$FS \leftarrow \begin{cases} \min(2, FS + 1) & \text{if } Q_{avg} > T_1, \\ \max(0, FS - 1) & \text{if } Q_{avg} < T_2. \end{cases}$$

The filter state update takes place only after I-pictures, and the new state does not go into effect until the next I-picture (this delay is referred to as implementation lag). Useful values of $T_1$ and T sub 2 are 10 and 5, respectively.

The particular choices of filters, filter states, filter state updata rule, and implementation lag described above represent but one of many possibilities within the scope of the invention. It is contemplated that there can be an arbitrary number of filters, and they can be nonlinear or spatially adaptive. Another important variation is to perform the filter state update more frequently, and to simultaneously reduce the implementation lag. For example, the filter state update can take place after every P-picture, with the implementation lag reduced to the delay between P-pictures.

We claim:

1. A method for the allocation of bits to be used to compression code digital data signals representing a set of pictures in a motion video sequence, comprising the steps of:

identifying each picture in said set to be compression coded as one of three types I, P, B;

determining the total number of bits to be used in compression coding said set of pictures based on a fixed target bit rate for said sequence; and allocating from said total number of bits, bits for use in compression coding a picture in said set by determining the allocations for each picture type in the set prior to compression coding each picture, using 1) the degree of difficulty of compression coding each picture type, and 2) the known numbers of each of the three picture types in said set, to produce allocations which meet said fixed target bit-rate.

2. A method as in claim 1 further comprising apportioning said total number of bits into two portions, one portion relating to said information and the other portion relating to transform coefficient data of the pictures to be coded, by:

allocating from said total, the number of bits for said side information portion for said set; and allocating the remaining bits from said total for said transform coefficient data portion, said remaining bits being further allocated by determining the allocations for each picture type in the set prior to compression coding each picture, using 1) the degree of difficulty of compression coding each picture type and 2) the known numbers of each of the three picture types in said set.

3. A method as in claim 1 wherein the allocation of bits for each picture type is proportional to the degree of difficulty in compression coding that picture type.

4. A method as in claim 1 wherein the allocation of bits for each picture type comprises allocating the number of bits to be used with each picture of a respective type.

5. A method as in claim 1 wherein the degree of difficulty of compression coding each picture type is determined using the difficulty of compression coding the pixel data of the picture about to be coded and at least one picture of said set already coded.

6. A method as in claim 1 wherein the degree of difficulty of compression coding each picture type is determined using the difficulty of compression coding the pixel difference data of the picture about to be coded and at least one picture of said set already coded.

7. A method as in claim 1 wherein the degree of difficulty of compression coding each picture type is determined using corresponding criteria for measuring the difficulty of compression coding the pixel data and the pixel difference data of the picture about to be coded and at least one picture of said set already coded.

8. A system for the allocation of bits to be used to compression code digital data signals representing a set of pictures in a motion video sequence, comprising:
means for identifying each picture in said set to be compression coded as one of three types I, P, B;
means for determining the total number of bits to be used in compression coding said set of pictures based on a fixed target bit rate for said sequence; and
means for allocating from said total number of bits, bits for use in compression coding a picture in said set by determining the allocations for each picture type in the set prior to compression coding each picture, using 1) the degree of difficulty of compression coding each picture type, and 2) the known numbers of each of the three picture types in said set, to produce allocations which meet said fixed target bit-rate.

9. A system as in claim 8 further comprising means for apportioning said total number of bits into two portions, one portion relating to side information and the other portion relating to transform coefficient data of the pictures to be coded, said apportioning means comprising:
means for allocating from said total, the number of bits for said side information portion for said set; and
means for allocating the remaining bits from said total for said transform coefficient data portion and for further allocating said remaining bits by determining the allocations for each picture type in the set prior to compression coding each picture, using 1) the degree of difficulty of compression coding each picture type and 2) the known numbers of each of the three picture types in said set.

10. A system as in claim 8 wherein said bit allocating means allocates the bits for each picture type in proportion to the degree of difficulty in compression coding that picture type.

11. A system as in claim 8 wherein said bit allocating means allocates the bits for each picture type by allocating the number of bits to be used with each picture of a respective type.

12. A system as in claim 8 wherein said bit allocating means comprises means for determining the degree of difficulty of compression coding each picture type using the difficulty of compression coding the pixel data of the picture about to be coded and at least one picture of said set already coded.

13. A system as in claim 8 wherein said bit allocating means comprises means for determining the degree of difficulty of compression coding each picture type using the difficulty of compression coding the pixel difference data of the picture about to be coded and at least one picture of said set already coded.

14. A system as in claim 8 wherein said bit allocating means comprises means for determining the degree of difficulty of compression coding each picture type using corresponding criteria for measuring the difficulty of compression coding the pixel data and the pixel difference data of the picture about to be coded and at least one picture of said set already coded.

15. A method for the compression coding of a motion video sequence, the pictures of which sequence are each represented by digital data signals indicative of the spatial regions making up said pictures, comprising the steps of:
identifying each picture to be compression coded as one of three types, I, P, or B;
receiving a bit allocation signal for each picture indicative of the number of bits allotted to compression coding said picture;
and compression coding each picture in said sequence, said compression coding comprising the steps of:
classifying each spatial region of a picture to be coded on the basis of the pixel data or pixel difference data of said spatial region;
determining a quantization step size to be used to code each spatial region of said picture on the basis of the classification of the spatial region and that of other spatial regions in said picture and said bit allocation signal for said picture;
dividing said picture into groups of spatial regions and allocating bits from said number of bits allotted to compression coding said picture among said groups;
successively compression coding said groups of spatial regions, using said determined quantization step sizes; and
after the compression coding of each group of spatial regions, adjusting the quantization step sizes to be applied to the remaining uncoded spatial regions in said picture, when the number of bits used for coding the already coded groups of said picture deviates from the bit allocation allotted to said already coded groups.

16. A system for the compression coding of a motion video sequence, the pictures of which sequence are each represented by digital data signals indicative of the spatial regions making up said pictures, comprising:
means for identifying each picture to be compression coded as one of three types, I, P, or B;
means for receiving a bit allocation signal for each picture indicative of the number of bits allotted to compression coding said picture; and
means for compression coding each picture in said sequence, said compression coding comprising:
means for classifying each spatial region of a picture to be coded on the basis of the pixel data or pixel difference data of said spatial region;
means for determining a quantization step size to be used to code each spatial region of said picture on the basis of the classification of the spatial region and that of other spatial regions in said picture and said bit allocation signal for said picture;
means for dividing said picture into groups of spatial regions and allocating bits from said number of bits allotted to compression coding said picture among said groups;
means for successively compression coding said groups of spatial regions, using said determined quantization step sizes; and
means, after the compression coding of each group of spatial regions, for adjusting the quantization step sizes to be applied to the remaining uncoded spatial regions in said picture, when the number of bits used for coding the already coded groups of said picture deviates from the bit allocation allotted to said already coded groups.

17. In a system for the compression coding of a motion video sequence wherein digital data signals indicative of the pictures in the sequence are processed by transformation and quantization, the steps comprising:

pre-processing the digital data signals of at least one picture in said sequence, according to one of a plurality of pre-processing methods, to produce a sequence of pre-processed picture digital data signals;

compression coding the pre-processed picture digital data signals, using transformation and quantization techniques; and selecting the pre-processing method to employ on the digital data signals for said picture, prior to compression coding said picture, in response to a signal indicative of the degree of quantization employed in the compression coding of previously coded pictures in said sequence.

18. In a system as in claim 17 further comprising the steps wherein the plurality of pre-processing methods are ranked according to their degrees of pre-processing in relation to corresponding degrees of quantization and at least one high threshold is selected with respect to said degrees of quantization; and selecting the pre-processing method for pre-processing said picture to be the same as that used to pre-process the preceding picture in said sequence, unless the degree of the quantization used to compression code the preceding picture exceeds said high threshold, whereupon a pre-processing method of a higher degree is selected to pre-process said picture.

19. In a system as in claim 17 further comprising the steps wherein the plurality of pre-processing methods are ranked according to their degrees of pre-processing in relation to corresponding degrees of quantization and at least one low threshold is selected with respect to said degrees of quantization; and selecting the pre-processing method for pre-processing said picture to be the same as that used to pre-process the preceding picture in said sequence, unless the degree of the quantization used to compression code the preceding picture is less than said low threshold, whereupon a pre-processing method of a lower degree is selected to pre-process said picture.

20. In a system as in claim 17 further comprising the steps wherein the plurality of pre-processing methods are ranked according to their degrees of pre-processing in relation to corresponding degrees of quantization and at least one threshold is selected with respect to said degrees of quantization; and selecting the pre-processing method to be used to pre-process said picture by comparing the degree of the quantization used to compression code the preceding picture in said sequence with said threshold, and producing a decision signal, in response to the result of said comparing, indicative of whether the degree of the pre-processing method should be changed.

21. In a system as in claim 20 wherein said decision signal indicates the changing of the degree of the pre-processing method only prior to compression coding pre-selected pictures in said sequence.

22. In a system as in claim 20 wherein the changing of the degree of the pre-processing method is delayed a number of pictures in said sequence following the picture at which said decision signal indicates a change in degree.

23. A system for the compression coding of a motion video sequence wherein digital data signals indicative of the pictures in the sequence are processed by transformation and quantization, comprising:

means for pre-processing the digital data signals of at least one picture in said sequence, according to one of a plurality of pre-processing methods, to produce a sequence of pre-processed picture digital data signals; and means, responsive to a signal indicative of the degree of quantization employed in the compression coding of previously coded pictures in said sequence, for selecting the pre-processing method to employ on the digital data signals for said one picture, prior to the compression coding of said one picture, and providing a signal to said pre-processing means indicative of the pre-processing method selected.

24. A system as in claim 23 further comprising means for ranking the plurality of pre-processing methods according to their degrees of pre-processing in relation to corresponding degrees of quantization and means for selecting at least one high threshold with respect to said degrees of quantization; and wherein said means for selecting selects the pre-processing method for pre-processing said picture to be the same as that used to pre-process the preceding picture in said sequence, unless the degree of the quantization used to compression code the preceding picture exceeds said high threshold, whereupon a pre-processing method of a higher degree is selected to pre-process said picture.

25. A system as in claim 23 further comprising means for ranking the plurality of pre-processing methods according to their degrees of pre-processing in relation to corresponding degrees of quantization and means for selecting at least one low threshold with respect to said degrees of quantization; and wherein said means for selecting selects the pre-processing method for pre-processing said picture to be the same as that used to pre-process the preceding picture in said sequence, unless the degree of the quantization used to compression code the preceding picture is less than said low threshold, whereupon a pre-processing method of a lower degree is selected to pre-process said picture.

26. A system as in claim 23 further comprising means for ranking the plurality of pre-processing methods according to their degrees of pre-processing in relation to corresponding degrees of quantization and means for selecting at least one threshold with respect to said degrees of quantization; and wherein said means for selecting selects the pre-processing method for pre-processing said picture by comparing the degree of the quantization used to compression code the preceding picture in said sequence with said threshold, and comprises means for producing a decision signal, in response to the result of said comparing, indicative of whether the degree of the pre-processing method should be changed.

27. A system as in claim 26 wherein said decision signal indicates the changing of the degree of the pre-processing method only prior to compression coding pre-selected pictures in said sequence.

28. A system as in claim 26 further comprising means, responsive to said decision signal, for delaying the changing of the degree of the pre-processing method a number of pictures in said sequence following the picture at which said decision signal indicates a change in degree.

29. In a system for the compression coding of a motion video sequence wherein digital data signals indicative of the pictures in the sequence are processed by transformation and quantization, the steps comprising:

pre-processing the digital data signals of at least one picture in said sequence, according to one of a plurality of pre-processing methods, to produce a sequence of pre-processed picture digital data signals;

selecting the pre-processing method to employ on the digital data signals for said picture, prior to compression coding said picture, in response to a signal indicative of the degree of quantization employed in the compression coding of previously coded pictures in said sequence.

allocating the bits to be used to compression code digital data signals representing a set of pictures in said motion video sequence, comprising the steps of:

identifying each picture in said set to be compression coded as one of three types I, P, B;

determining the total number of bits to be used in compression coding said set of pictures based on a fixed target bit rate for said sequence; and allocating from said total number of bits, bits for use in compression coding a picture in said set by determining the allocations for each picture type in the set prior to compression coding each picture, using 1) the degree of difficulty of compression coding each picture type, and 2) the known numbers of each of the three picture types in said set, to produce allocations which meet said fixed target bit-rate; and compression coding of a motion video sequence, the pictures of which sequence are each represented by digital data signals indicative of the spatial regions making up said pictures, comprising the steps of:

receiving a bit allocation signal for each picture indicative of the number of bits allotted to compression coding said picture;

and compression coding each picture in said sequence, said compression coding comprising the steps of:

classifying each spatial region of a picture to be coded on the basis of the pixel data or pixel difference data of said spatial region;

determining a quantization step size to be used to code each spatial region of said picture on the basis of the classification of the spatial region and that of other spatial regions in said picture and said bit allocation signal for said picture;

dividing said picture into groups of spatial regions and allocating bits from said number of bits allotted to compression coding said picture among said groups;

successively compression coding said groups of spatial regions, using said determined quantization step sizes; and after the compression coding of each group of spatial regions, adjusting the quantization step sizes to be applied to the remaining uncoded spatial regions in said picture, when the number of bits used for coding the already coded groups of said picture deviates from the bit allocation allotted to said already coded groups.

30. A system for the compression coding of a motion video sequence wherein digital data signals indicative of the pictures in the sequence are processed by transformation and quantization, comprising:

means for pre-processing the digital data signals of at least one picture in said motion video sequence, according to one of a plurality of pre-processing methods, to produce a sequence of pre-processed picture digital data signals;

means for producing a signal indicative of the degree of quantization employed in the compression coding of previously coded pictures in said motion video sequence;

means for selecting the pre-processing method to be employed by said pre-processing means on the digital data signals for said picture, prior to compression coding said picture, in response to a signal from said signal producing means indicative of the degree of quantization employed in the compression coding of previously coded pictures in said motion video sequence;

means for allocating the bits to be used to compression code digital data signals representing a set of pictures in said motion video sequence, comprising:

means for identifying each picture in said set to be compression coded as one of three types I, P, B;

means for determining the total number of bits to be used in compression coding said set of pictures based on a fixed target bit rate for said sequence; and means for allocating from said total number of bits, bits for use in compression coding a picture in said set by determining the allocations for each picture type in the set prior to compression coding each picture, using 1) the degree of difficulty of compression coding each picture type, and 2) the known numbers of each of the three picture types in said set, to produce allocations which meet said fixed target bit-rate; and means for compression coding said motion video sequence, by compression coding each picture in said sequence and the pictures of which sequence are each represented by digital data signals indicative of the spatial regions making up said pictures, comprising:

means for producing a bit allocation signal for each picture, said bit allocation signals being respectively indicative of the number of bits allotted to compression coding each picture;

means for classifying each spatial region of a picture to be coded on the basis of the pixel data or pixel difference data of said spatial region;

means for determining a quantization step size to be used to code each spatial region of said picture on the basis of the classification of the spatial region and that of other spatial regions in said picture and said bit allocation signal for said picture;

means for dividing said picture into groups of spatial regions and allocating bits from said number of bits allotted to compression coding said picture among said groups;

means for successively compression coding said groups of spatial regions, using said determined quantization step sizes; and means for adjusting, after the compression coding of each group of spatial regions, the quantization step sizes to be applied to the remaining uncoded spatial regions in said picture, when the number of bits used for coding the already coded groups of said picture deviates from the bit allocation allotted to said already coded groups.

* * * * *